United States Patent
Sloan et al.

(10) Patent No.: US 10,865,732 B2
(45) Date of Patent: Dec. 15, 2020

(54) SYSTEMS AND METHODS FOR MONITORING AND CONTROLLING FUEL SYSTEMS

(71) Applicant: Agility Fuel Systems LLC, Costa Mesa, CA (US)

(72) Inventors: Todd Sloan, Kelowna (CA); Chris Forsberg, Kelowna (CA)

(73) Assignee: Agility Fuel Systems LLC, Costa Mesa, CA (US)

( * ) Notice: Subject to any disclaimer, the term of this patent is extended or adjusted under 35 U.S.C. 154(b) by 0 days.

(21) Appl. No.: 16/247,148

(22) Filed: Jan. 14, 2019

(65) Prior Publication Data
US 2019/0285023 A1     Sep. 19, 2019

Related U.S. Application Data

(63) Continuation of application No. 15/839,733, filed on Dec. 12, 2017, now Pat. No. 10,215,127, which is a
(Continued)

(51) Int. Cl.
*F02D 45/00* (2006.01)
*B60K 15/03* (2006.01)
*G01F 23/18* (2006.01)

(52) U.S. Cl.
CPC ........ *F02D 45/00* (2013.01); *B60K 15/03006* (2013.01); *G01F 23/18* (2013.01); *B60K 2015/03013* (2013.01)

(58) Field of Classification Search
CPC ............. F02D 45/00; B60K 15/03006; B60K 2015/03013; G01F 23/18
See application file for complete search history.

(56) References Cited

U.S. PATENT DOCUMENTS 4,408,484 A    10/1983   Erickson
5,230,322 A    7/1993    Curran et al.
(Continued)

FOREIGN PATENT DOCUMENTS

CA    2198157 A1    8/1997
CA    2203842 A1    10/1997
(Continued)

OTHER PUBLICATIONS

European search report dated Sep. 16, 2016 for EP Application No. 12854751.0.
(Continued)

*Primary Examiner* — Joseph J Dallo
(74) *Attorney, Agent, or Firm* — Knobbe, Martens, Olson & Bear, LLP

(57) ABSTRACT

Systems and methods may be provided for monitoring a fuel level of a vehicle. The fuel may be a gaseous fuel, such as natural gas. An electronic control unit may be able to receive a signal from one or more sensors. The electronic control unit may provide a command to drive a fuel gauge to display the fuel level. The electronic control unit may determine the gauge command based on the received signal and a filling compensation scheme. The electronic control unit may be initialized through a user interface. A filling compensation scheme may be selected during initialization. The electronic control unit may be capable of communicating various sensors, gauges, devices, controls and/or other ECUs of varying specifications.

17 Claims, 11 Drawing Sheets

Related U.S. Application Data continuation of application No. 13/708,662, filed on Dec. 7, 2012, now Pat. No. 9,850,845.

(60) Provisional application No. 61/568,120, filed on Dec. 7, 2011.

(56) References Cited

U.S. PATENT DOCUMENTS

| | | |
|---|---|---|
| 5,343,847 A | 9/1994 | Chasteen et al. |
| 5,377,646 A | 1/1995 | Chasteen |
| 5,379,637 A | 1/1995 | Abowd et al. |
| 5,415,001 A | 5/1995 | Powars |
| 5,433,071 A | 7/1995 | Willey et al. |
| 5,452,738 A | 9/1995 | Borland et al. |
| 5,474,054 A | 12/1995 | Povinger et al. |
| 5,483,943 A | 1/1996 | Peters |
| 5,488,978 A | 2/1996 | Kountz et al. |
| 5,511,576 A | 4/1996 | Borland |
| 5,533,492 A | 7/1996 | Willey et al. |
| 5,542,392 A | 8/1996 | Povinger |
| 5,542,398 A | 8/1996 | Marcon |
| 5,562,117 A | 10/1996 | Borland et al. |
| 5,570,729 A | 11/1996 | Mutter |
| 5,579,728 A | 12/1996 | Gotmalm |
| 5,584,467 A | 12/1996 | Harnett et al. |
| 5,628,349 A | 5/1997 | Diggins et al. |
| 5,632,297 A | 5/1997 | Sciullo et al. |
| 5,641,005 A | 6/1997 | Kountz et al. |
| 5,647,503 A | 7/1997 | Steele et al. |
| 5,755,254 A | 5/1998 | Carter et al. |
| 5,765,602 A | 6/1998 | Sutton et al. |
| 5,788,212 A | 8/1998 | Hackman et al. |
| 5,791,367 A | 8/1998 | Hackman et al. |
| 5,797,425 A | 8/1998 | Carter et al. |
| 5,810,058 A | 9/1998 | Kountz et al. |
| 5,820,102 A | 10/1998 | Borland |
| 5,868,176 A | 2/1999 | Barajas et al. |
| 5,881,779 A | 3/1999 | Kountz et al. |
| 5,887,799 A | 3/1999 | Smith |
| 5,901,758 A | 5/1999 | Hwang et al. |
| 5,946,095 A | 8/1999 | Henningsen |
| 5,992,219 A | 11/1999 | Otaka |
| 6,007,049 A | 12/1999 | Wass et al. |
| 6,041,762 A | 3/2000 | Sirosh et al. |
| 6,044,825 A | 4/2000 | Carter et al. |
| 6,086,103 A | 7/2000 | Fukagawa et al. |
| 6,092,504 A | 7/2000 | Barnes et al. |
| 6,125,637 A | 10/2000 | Bingham et al. |
| 6,161,783 A | 12/2000 | Press |
| 6,186,168 B1 | 2/2001 | Schultz et al. |
| 6,196,205 B1 | 3/2001 | Volker |
| 6,196,280 B1 | 3/2001 | Tate et al. |
| 6,202,688 B1 | 3/2001 | Khadim |
| 6,279,612 B1 | 8/2001 | Warth |
| 6,354,088 B1 | 3/2002 | Emmer et al. |
| 6,382,232 B1 | 5/2002 | Portmann |
| 6,412,588 B1 | 7/2002 | Scott et al. |
| 6,418,962 B1 | 7/2002 | Wozniak et al. |
| 6,427,660 B1 | 8/2002 | Yang |
| 6,494,191 B2 | 12/2002 | Bingham et al. |
| 6,495,032 B2 | 12/2002 | Miller et al. |
| 6,505,611 B1 | 1/2003 | Oxley |
| 6,523,565 B2 | 2/2003 | Girouard |
| 6,536,722 B2 | 3/2003 | Sadowski et al. |
| 6,539,775 B2 | 4/2003 | DriftmeierH. |
| 6,540,204 B1 | 4/2003 | Carter |
| 6,543,423 B2 | 4/2003 | Dobryden et al. |
| 6,557,814 B1 | 5/2003 | Rutz |
| 6,557,821 B2 | 5/2003 | Girouard et al. |
| 6,575,194 B1 | 6/2003 | Miller et al. |
| 6,598,624 B2 | 7/2003 | Togasawa et al. |
| 6,619,273 B2 | 9/2003 | Bingham et al. |
| 6,619,336 B2 | 9/2003 | Cohen et al. |
| 6,634,321 B2 | 10/2003 | Hussain et al. |
| 6,634,342 B1 | 10/2003 | Wouters et al. |
| 6,655,422 B2 | 12/2003 | Shock |
| 6,664,533 B1 | 12/2003 | van der Laan et al. |
| 6,708,573 B1 | 3/2004 | Cohen et al. |
| 6,726,892 B1 | 4/2004 | Au |
| 6,736,229 B1 | 5/2004 | Amori et al. |
| 6,748,931 B2 | 6/2004 | Ricco |
| 6,766,269 B2 | 7/2004 | Lee |
| 6,786,245 B1 | 9/2004 | Eichelberger et al. |
| 6,810,924 B2 | 11/2004 | White |
| 6,811,141 B2 | 11/2004 | Green |
| 6,843,237 B2 | 1/2005 | Bowen et al. |
| 6,845,965 B2 | 1/2005 | Lanting et al. |
| 6,851,445 B2 | 2/2005 | Girouard |
| 6,880,719 B1 | 4/2005 | Sutton et al. |
| 6,901,952 B2 | 6/2005 | Girouard |
| 6,910,468 B2 | 6/2005 | Yamaoka et al. |
| 6,951,207 B2 | 10/2005 | Yamaoka et al. |
| 6,953,028 B2 | 10/2005 | Bingham et al. |
| 6,957,171 B2 | 10/2005 | White et al. |
| 6,979,919 B2 | 12/2005 | Gotmalm |
| 7,044,113 B2 | 5/2006 | Bingham et al. |
| 7,055,506 B2 | 6/2006 | Kaiser et al. |
| 7,059,276 B2 | 6/2006 | Yamaoka et al. |
| 7,140,354 B1 | 11/2006 | Hashemi |
| 7,152,637 B2 | 12/2006 | Hoke |
| 7,154,248 B2 | 12/2006 | Velhner et al. |
| 7,161,330 B2 | 1/2007 | Velhner et al. |
| 7,182,073 B1 | 2/2007 | Kim |
| 7,189,040 B2 | 3/2007 | Sharp |
| 7,215,100 B2 | 5/2007 | Velhner et al. |
| 7,222,836 B2 | 5/2007 | Chen et al. |
| 7,232,156 B2 | 6/2007 | Rife et al. |
| 7,245,112 B2 | 7/2007 | Velhner et al. |
| 7,275,444 B1 | 10/2007 | Kurtz et al. |
| 7,309,113 B2 | 12/2007 | Carter |
| 7,322,228 B2 | 1/2008 | Courrieu |
| 7,325,561 B2 | 2/2008 | Mathison et al. |
| 7,350,604 B2 | 4/2008 | Veenstra et al. |
| 7,490,586 B1 | 2/2009 | Weller |
| 7,546,834 B1 | 6/2009 | Urley et al. |
| 7,568,507 B2 | 8/2009 | Farese et al. |
| 7,743,785 B2 | 6/2010 | Rohwer et al. |
| 7,837,054 B2 | 11/2010 | Oyen et al. |
| 7,868,775 B2 | 1/2011 | Sirosh et al. |
| 7,918,207 B2 | 4/2011 | Pursifull et al. |
| 7,970,528 B2 | 6/2011 | Janarthanam et al. |
| 8,020,589 B2 | 9/2011 | Cohen et al. |
| 8,126,636 B2 | 2/2012 | Jauss |
| 8,214,129 B2 | 7/2012 | Pursifull |
| 8,215,331 B2 | 7/2012 | Chen |
| 8,232,750 B2 | 7/2012 | Smugeresky et al. |
| 8,286,670 B2 | 10/2012 | Faudou et al. |
| 8,322,357 B2 | 12/2012 | Chen |
| 8,708,005 B2 | 4/2014 | Mori |
| 8,973,623 B2 | 3/2015 | Mori |
| 9,016,329 B2 | 4/2015 | Mori |
| 9,109,750 B2 | 8/2015 | Okawachi et al. |
| 9,114,781 B2 | 8/2015 | Wake et al. |
| 9,395,047 B2 | 7/2016 | Ding |
| 9,457,652 B2 | 10/2016 | Sloan et al. |
| 9,850,845 B2 | 12/2017 | Sloan et al. |
| 10,144,280 B2 | 12/2018 | Sloan et al. |
| 10,215,127 B2 | 2/2019 | Sloan et al. |
| 2002/0014277 A1 | 2/2002 | Togasawa et al. |
| 2002/0053365 A1 | 5/2002 | Mutter |
| 2002/0083932 A1 | 7/2002 | Ishikawa et al. |
| 2003/0140902 A1 | 7/2003 | Seifert et al. |
| 2003/0216883 A1 | 11/2003 | Lee |
| 2005/0161934 A1 | 7/2005 | Rife et al. |
| 2005/0178463 A1 | 8/2005 | Kountz et al. |
| 2005/0193989 A1 | 9/2005 | Veenstra et al. |
| 2005/0236778 A1 | 10/2005 | Jupp |
| 2005/0247123 A1 | 11/2005 | Fuse |
| 2006/0042606 A1 | 3/2006 | Van Dyke |
| 2006/0054145 A1 | 3/2006 | Hayashi et al. |
| 2006/0060033 A1 | 3/2006 | Warner et al. |
| 2006/0118175 A1 | 6/2006 | Mathison et al. |
| 2006/0163522 A1 | 7/2006 | Gallagher et al. |
| 2006/0180240 A1 | 8/2006 | Niedzwiechi et al. |

(56) References Cited

U.S. PATENT DOCUMENTS

| | | |
|---|---|---|
| 2007/0186982 A1 | 8/2007 | Cohen et al. |
| 2007/0233360 A1 | 10/2007 | Hill et al. |
| 2007/0257043 A1 | 11/2007 | Kanoya et al. |
| 2008/0023918 A1 | 1/2008 | Strasser et al. |
| 2008/0029072 A1 | 2/2008 | Ceratto |
| 2008/0245437 A1 | 10/2008 | Shige |
| 2009/0044877 A1 | 2/2009 | Faudou et al. |
| 2009/0064586 A1 | 3/2009 | Munshi et al. |
| 2009/0071542 A1 | 3/2009 | Oh et al. |
| 2009/0188479 A1 | 7/2009 | Haudel |
| 2009/0205745 A1 | 8/2009 | Farese et al. |
| 2009/0236163 A1 | 9/2009 | Wibbeke et al. |
| 2009/0283068 A1 | 11/2009 | Willison |
| 2010/0010727 A1 | 1/2010 | Cippitani |
| 2010/0078244 A1 | 4/2010 | Pursifull |
| 2010/0108038 A1 | 5/2010 | Kang |
| 2010/0108423 A1 | 5/2010 | Keel |
| 2010/0108687 A1 | 5/2010 | Adkins et al. |
| 2010/0126468 A1 | 5/2010 | Martin |
| 2010/0148952 A1 | 6/2010 | Barajas |
| 2010/0256859 A1 | 10/2010 | Leyerle et al. |
| 2010/0276031 A1 | 11/2010 | Saiki et al. |
| 2010/0288367 A1 | 11/2010 | Pursifull |
| 2010/0294250 A1 | 11/2010 | Jauss |
| 2010/0294776 A1 | 11/2010 | Liu |
| 2010/0307454 A1 | 12/2010 | Ulrey et al. |
| 2010/0307636 A1 | 12/2010 | Uemura |
| 2010/0318277 A1 | 12/2010 | Pursifull et al. |
| 2011/0011381 A1 | 1/2011 | Vandenberghe |
| 2011/0068606 A1 | 3/2011 | Kilmek et al. |
| 2011/0114194 A1 | 5/2011 | Chen |
| 2011/0153141 A1 | 6/2011 | Beechie et al. |
| 2011/0160992 A1 | 6/2011 | Crombez |
| 2011/0181426 A1 | 7/2011 | Bucciero |
| 2011/0206951 A1 | 8/2011 | Ford et al. |
| 2011/0210515 A1 | 9/2011 | Sharp et al. |
| 2011/0210516 A1 | 9/2011 | Sharp et al. |
| 2011/0250547 A1 | 10/2011 | Brown et al. |
| 2011/0252962 A1 | 10/2011 | Von Helmolt et al. |
| 2012/0000209 A1 | 1/2012 | Adkins et al. |
| 2012/0000574 A1 | 1/2012 | Nishiumi |
| 2012/0041665 A1 | 2/2012 | Pursifull et al. |
| 2012/0095667 A1 | 4/2012 | Hase |
| 2012/0111447 A1 | 5/2012 | Mori et al. |
| 2012/0125480 A1 | 5/2012 | Inagi et al. |
| 2012/0132301 A1 | 5/2012 | Hobmeyer et al. |
| 2012/0161430 A1 | 6/2012 | Mulanon |
| 2012/0205003 A1 | 8/2012 | Okawachi et al. |
| 2012/0227864 A1 | 9/2012 | Mori |
| 2012/0255621 A1 | 10/2012 | Meade |
| 2012/0267002 A1 | 10/2012 | Kittilsen et al. |
| 2012/0296552 A1 | 11/2012 | Matthews, Jr. et al. |
| 2013/0001384 A1 | 1/2013 | Karlsson et al. |
| 2015/0367727 A1 | 12/2015 | Sloan et al. |
| 2018/0312121 A1 | 11/2018 | Weber et al. |
| 2018/0315256 A1 | 11/2018 | Weber et al. |

FOREIGN PATENT DOCUMENTS

| | | |
|---|---|---|
| CA | 2414220 A1 | 1/2001 |
| CA | 2416161 A1 | 2/2002 |
| CA | 2384915 A1 | 11/2002 |
| CA | 2495711 A1 | 8/2005 |
| CA | 2504495 A1 | 10/2005 |
| CA | 2770365 A1 | 5/2011 |
| CA | 2791322 A1 | 9/2011 |
| CA | 2791330 A1 | 9/2011 |
| EP | 1403119 B1 | 9/2006 |
| EP | 1717564 A1 | 11/2006 |
| KR | 100844223 B1 | 7/2008 |
| WO | WO 1993/000264 A1 | 1/1993 |
| WO | WO 1997/020167 A1 | 6/1997 |
| WO | WO 1999/054700 A2 | 10/1999 |
| WO | WO 2010/090981 A2 | 8/2010 |
| WO | WO 2011/012937 A1 | 2/2011 |
| WO | WO 2011/084977 A2 | 7/2011 |
| WO | WO 2011/091695 A1 | 8/2011 |
| WO | WO 2012/019707 A1 | 2/2012 |
| WO | WO 2012/054279 A2 | 4/2012 |
| WO | WO 2012/129701 A1 | 10/2012 |
| WO | WO 2012/149067 A2 | 11/2012 |
| WO | WO 2013/086345 A1 | 6/2013 |

OTHER PUBLICATIONS

European search report with written opinion dated Dec. 20, 2016 for EP Application No. 12854751.

International search report and written opinion dated Mar. 22, 2013 for PCT/US2012/068480.

Vehicle Fuel Systems and Onboard Fuel Storage. Accesed Aug. 6, 2014. http://www.cumminswestport.com/vehicle-fuel-systems.

ion is a continuation application of U.S. application Ser. No. 15/839,733, filed Dec. 12, 2017, which is a continuation application of U.S. application Ser. No. 13/708,662, filed on Dec. 7, 2012, which claims the benefit of U.S. Provisional Patent Application Ser. No. 61/568,120, filed Dec. 7, 2011, which applications are incorporated herein by reference in their entirety.

SYSTEMS AND METHODS FOR MONITORING AND CONTROLLING FUEL SYSTEMS

CROSS-REFERENCE

This applicat

BACKGROUND OF INVENTION

Natural gas is a consideration as an alternative fuel for vehicles. In a natural gas-powered vehicle, a vehicle operator should be able to read from a fuel gauge a measure of fuel in the vehicle to obtain an accurate representation of the remaining energy content of the vehicle, and thus the remaining driving range of the vehicle.

Challenges remain for providing an accurate read of the remaining fuel in changing conditions (e.g., changing temperatures). Furthermore, different vehicles may utilize different sensors and gauge configurations. Another concern for high pressure natural gas may be safety during fueling. Additionally, concerns for leakage and service/maintenance of the vehicle may be provided.

A need exists for improved systems and methods for monitoring a fuel level that may be able to compensate for various conditions. A need exists for a controller that may be able to assist with monitoring a fuel level, and that may be able to operate with various sensors and gauge configurations. A need exists for systems and methods that improve safety and life of the vehicle and/or vehicle fuel system.

SUMMARY OF INVENTION

Systems and methods may be provided for monitoring a fuel level of a vehicle. The fuel may be a gaseous fuel, such as natural gas. An electronic control unit may be able to receive a signal from one or more sensors. The electronic control unit may provide a command to drive a fuel gauge to display the fuel level. The electronic control unit may determine the gauge command based on the received signal and a filling compensation scheme. The electronic control unit may be initialized through a user interface. A filling compensation scheme may be selected during initialization. The electronic control unit may be capable of communicating with various sensors, gauges, devices, controls and/or other ECUs of varying specifications.

An aspect of the invention may be directed to a method for monitoring gaseous fuel level comprising: receiving, at an electronic control unit, at least one signal from one or more sensors configured to monitor a condition of a gaseous fuel containing device; receiving, at the electronic control unit, a selected filling compensation scheme chosen from a plurality of filling compensation schemes; and based on the at least one signal and the selected filling compensation scheme, sending a signal to a gauge, thereby causing the gauge to display the gaseous fuel level.

Another aspect of the invention may provide a method for initializing an electronic control unit, said method comprising: connecting the electronic control unit to one or more sensors configured to monitor a condition of a gaseous fuel containing device; connecting the electronic control unit with one or more initialization device having a display showing a user interface; entering, via the user interface, specifications for the one or more sensor.

A further aspect of the invention relates to a vehicle control system comprising: a gaseous fuel containing device of the vehicle; an electronic control unit capable of communicating one or more data with one or more entities on the vehicle and/or remote from the vehicle, wherein the entities include a sensor, a gauge and at least one of the following: a control, another electronic control unit, a device, or an information system hosted on a device, wherein the electronic control unit is configured to enable logging and acquisition of the communicated data, and wherein the communicated data express a condition, a state or an instruction regarding a condition or a state of the gaseous fuel containing device.

Aspects of the invention may be directed to safety of the vehicle during fueling. One, two, three or more switches may be provided to check that the fuel dispenser is disconnected from a receptacle by preventing engine cranking. Such switches may optionally not use relays. Such switches may be spark proof.

Aspects of the invention further address gas leakage. Gas leakage may be detected, and an alarm may be sent to the driver. This may assist with maintenance and the proper operation of the system. An alert may also be provided for a defined period (e.g., cycle of filling) to the driver, to check or repair the system. The service alert may assist with the maintenance and safety of the fuel system. It is beneficial for high pressure tanks that have limited life to check on their status at appropriate times, such as filling cycle.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the below. A better understanding of the features and advantages of the present invention will be obtained by reference to the following detailed description that sets forth illustrative embodiments, in which the principles of the invention are utilized, and the accompanying drawings of which:

FIG. 4A provides a perspective view of the control box. FIG. 4B provides a top view of the control box. FIG. 4C shows a side view of the control box. FIG. 4D shows a side view of another side of the control box.

DETAILED DESCRIPTION OF INVENTION

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for monitoring fuel levels in accordance with aspects of the invention. Various aspects of the invention described herein may be applied to any of the particular applications set forth below or for any other types of gaseous fuel monitoring systems. The invention may be applied as a standalone system or method, or as part of a vehicle or other system that utilizes gaseous fuel. It shall be understood that different aspects of the invention can be appreciated individually, collectively, or in combination with each other.

Figure 1:
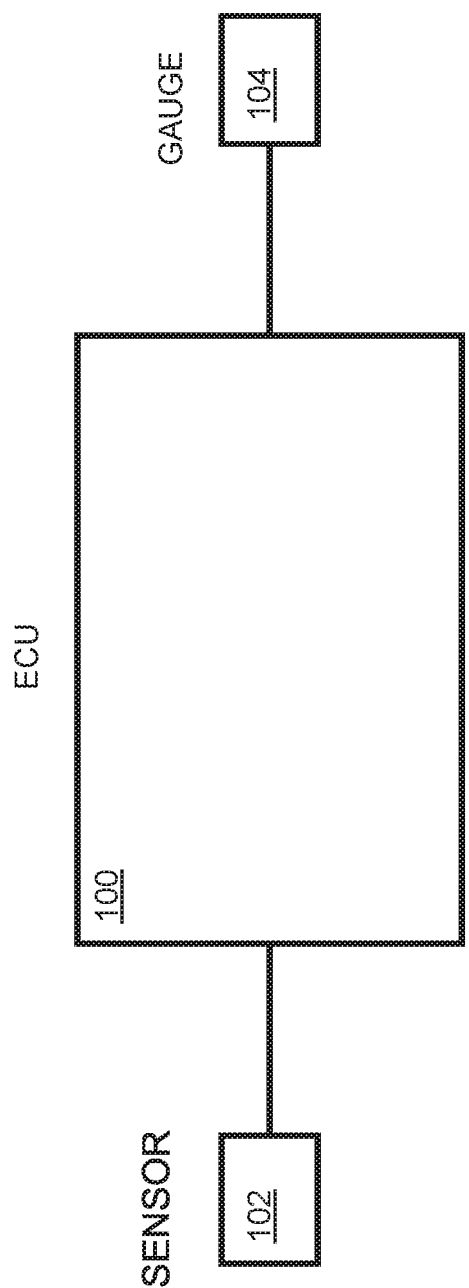
FIG. 1 shows an example of an electronic control unit (ECU).

FIG. 1 shows an example of an electronic control unit (ECU) 100 in accordance with an embodiment of the invention. The ECU may be in communication with one or more sensors 102 and one or more gauges 104.

A sensor 102 may be in communication with a gaseous fuel containing device. The sensor may be a pressure sensor, temperature sensor, accelerometer, optical sensor, shock sensor, damage sensor, acoustic sensor, or any other type of sensor. Examples of types of pressure sensors may include a piezoresistive strain gauge, capacitive pressure sensor, electromagnetic pressure sensor, piezoelectric pressure sensor, optical pressure sensor, potentiometric pressure sensor, resonant pressure sensor, thermal pressure sensor, and/or ionization pressure sensor. In some embodiments, the pressure sensors may have ratiometric voltage output of about 0 to 5 volts. An example of a temperature sensor may include a variable resistance sensor, thermocouple, thermometer, or any other temperature sensor. In some embodiments, the temperature sensors may have ratiometric voltage output of about 0 to 5 volts. In some embodiments, a transducer may be provided (e.g., for pressure and temperature) that may provide an electronic signal to the ECU. In some embodiments, a plurality of sensors may be in communication with the ECU. The plurality of sensors may be the same type of sensors, or may include different types of sensors. For example one or more temperature sensors and one or more pressure sensors may be in communication with the ECU.

One or more sensors 102 may be in communication with the ECU 100. The one or more sensor may be connected to the ECU. For example, the one or more sensor may be connected to the ECU via three or more lines (e.g., positive, negative, signal). When a plurality of sensors are integrated (e.g., pressure and temperature), positive and negative powers may be common. One or more voltage send line may be provided (e.g., 5 volt send line), and one or more return data line may be provided. In one example, a temperature sensor may be coupled to the ECU via three or more lines (e.g., +5 V, −5 V, signal) and may provide a signal on a data line indicative of the temperature of the natural gas in a gaseous fuel containing device, or the temperature of the gaseous fuel containing device, or the temperature of one or more plumbing lines, or the ambient temperature. In some instances, a separate sensor may be provided for ambient temperature. For example, a sensor on the ECU board, such as a chip temperature sensor may be provided. In an alternate embodiment, a sensor may communicate with the ECU wirelessly.

The ECU 100 may receive one or more signal from the one or more sensors 102. The ECU may be responsive to the signals from the sensors, and may determine a command to send to a gauge 104. The command to the gauge may be indicative of the amount of fuel remaining in the gaseous fuel containing device. The ECU may comprise one or more circuit that may filter one or more signal. For example, the ECU may comprise a circuit that may filter a received signal (e.g., from a sensor), or filter a signal that is to be output (e.g., to a gauge).

The ECU may contain a printed circuit board with embedded (configurable) programmed logic. The ECU may contain memory. The memory may contain tangible computer readable media such as code, logic, instructions for performing one or more steps. These may include steps in accordance with one or more algorithm that may determine a fuel level based on received signals. One or more calculation may be performed based on received signals and/or stored data. Such calculations may utilize a gas law. The calculations may take the non-linearity of gas compressibility into account. In some alternate embodiments, a memory may store a look-up table that may include one or more gauge command provided based on sensor input. Alternatively no look-up table for gauge commands based on sensor input is provided. The ECU may contain one or more processor. The one or more processors may be microprocessors. The microprocessors may be useful to determine a command to be sent to the gauge depending on input received at the ECU. The microprocessors may perform one or more steps as dictated by non-transitory computer readable media stored in memory. A microcontroller and interface software may be provided. The interface software may run on the ECU or an initialization device.

The ECU may have a housing, such as a plastic enclosure. The ECU may have electrical plugs that may provide connection interfaces with one or more other devices.

The ECU 100 may be in communication with a gauge 104. The ECU may be connected to the gauge. For example, the ECU may be connected to the gauge via a line. In one example, a temperature sensor may be coupled to the ECU via two, three, or more lines and may provide a signal on a data line indicative of the temperature of the natural gas in a gaseous fuel containing device, or the temperature of the gaseous fuel containing device, or the temperature of one or more plumbing lines, or the ambient temperature. In an alternate embodiment, an ECU may communicate with the gauge wirelessly.

Any type of gauge 104 may be utilized in accordance with embodiments of the invention. The gauge may be capable of receiving a command from the ECU, and based on said command, displaying a fuel level. The fuel level may be displayed via a rotating spindle, as a sliding needle, digitally, as an image, as an audio indicator, or any other visual or audio indicator. The fuel level may be displayed in volume measurements (e.g., gallons or liters remaining), percentages (e.g., 67% of fuel left), status (e.g., full, empty), fraction (e.g., ⅓ remaining), or any units (e.g., 5 out of 10 bars full).

Figure 2:
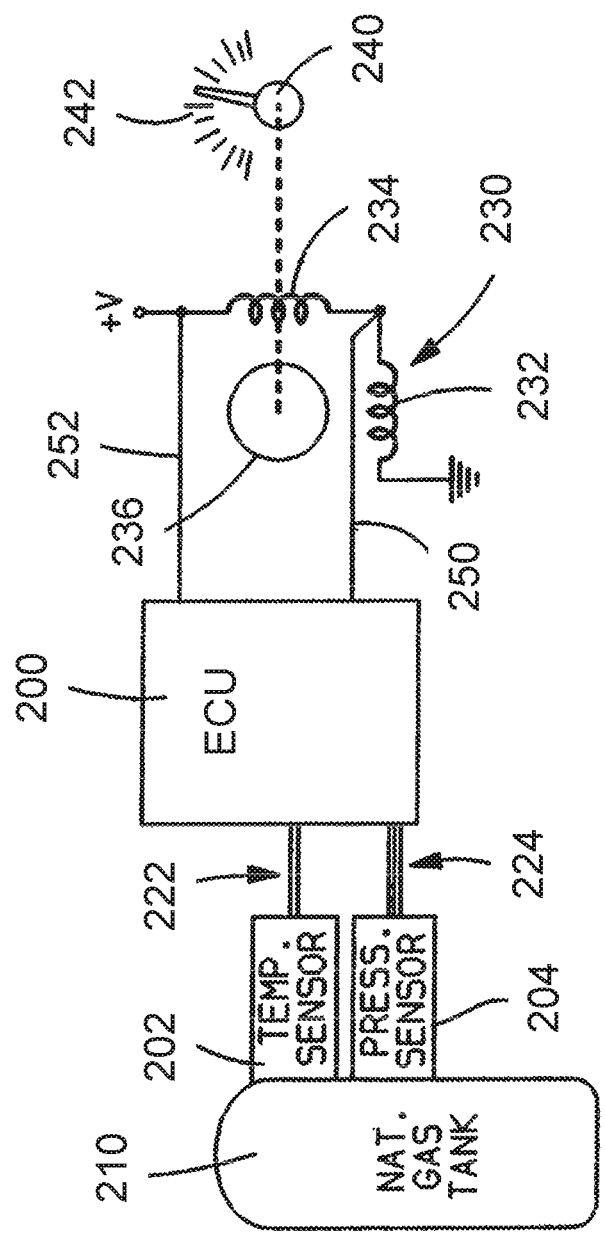
FIG. 2 shows an example of an ECU within a fuel monitoring system.

FIG. 2 shows an example of an ECU 200 within a fuel monitoring system. One or more sensors, such as a temperature sensor 202, pressure sensor 204, or any other type of sensor such as those described elsewhere herein, may be in communication with the ECU. The sensors may be connected to a gaseous fuel containing device 210. In some embodiments, a temperature sensor and/or pressure sensor may be capable of detecting the temperature and/or pressure, respectively, of the gaseous fuel within the fuel containing device, the device itself, or ambient conditions. In one example, the temperature sensor may detect a temperature within the gaseous fuel containing device, and the pressure sensor may detect a pressure within the gaseous fuel containing device.

A gaseous fuel containing device 210 may be a tank, container, or vessel. The gaseous fuel containing device may be capable of containing a gaseous fuel, such as natural gas, therein. Any reference to gaseous fuel may include natural gas. This may include liquefied natural gas (LNG) or compressed natural gas (CNG). A gaseous fuel may include hydrogen or hydrogen based gas, hythane, H2CNG, or any other gas. Any reference to gaseous fuel may include a fuel stored as a compressed gas, as a liquefied gas or as a liquid under its own vapor pressure, including, but not limited to, compressed natural gas (CNG), liquefied natural gas (LNG), liquefied petroleum gas (LPG), Diesel fuel, gasoline, dimethyl ether (DME), methanol, ethanol, butanol, Fischer-Tropsch (FT) fuels, hydrogen or hydrogen-based gas, hythane, HCNG, syngas and/or other alternative fuels or fuel blends.

In some embodiments, a temperature sensor 202 and a pressure sensor 204 may be connected to the ECU 200 via wired connections 222, 224. For example, the temperature sensor may be connected to the ECU via one, two, or more lines. The pressure sensor may be connected to the ECU via one, two, or more lines. Any sensor, such as those described elsewhere herein, may be connected to the ECU via one, two, or more lines. Alternatively, one or more sensors, such as the temperature sensor and/or pressure sensor, may be connected to the ECU wirelessly.

The ECU 200 may be connected to a gauge 230. An example of a gauge may be a two coil air core gauge. The two coil air core gauge may comprise coils 232 and 234 wound substantially perpendicular to each other on a bobbin (not shown) around a rotatable magnetic rotor 236. As current is provided to the two coils of the air core gauge 230, the two coils may create a composite magnetic vector having a direction to which the magnetic rotor 236 rotates to align itself. A spindle (not shown) may be attached to the rotor and may rotate with the rotor. Pointer 240 may be staked to the spindle, in a manner well known to those skilled in the art, and rotates with the spindle and rotor 236 to indicate, together with display graphics 242, a measure of fuel in the gaseous fuel containing device 210. The gauge indication may be representative of the percentage that the tank is full of natural gas, e.g., F (Full), ½ (50% full), E (empty), or any other fuel level display as described elsewhere herein.

The command on line 250 may vary the voltage at the junction of coils 232 and 234, varying the ratio of the voltages across coils 232 arid 234. In response to the changing voltage ratio across coils 232 and 234, current through the coils may change, changing the magnitudes of the magnetic fields created by the two coils and the direction of the resultant composite magnetic vector to which the rotor 236 may rotate (rotating the spindle and pointer) to align itself.

Lines 250 and 252 may provide feedback of the actual voltages across the coils of the gauge 230 for closed loop control of gauge 230 in the manner described below.

A two coil air core gauge is provided by way of example only. Other gauges known in the art may be used. For example, various gauges may be driven by the ECU.

Figure 3:
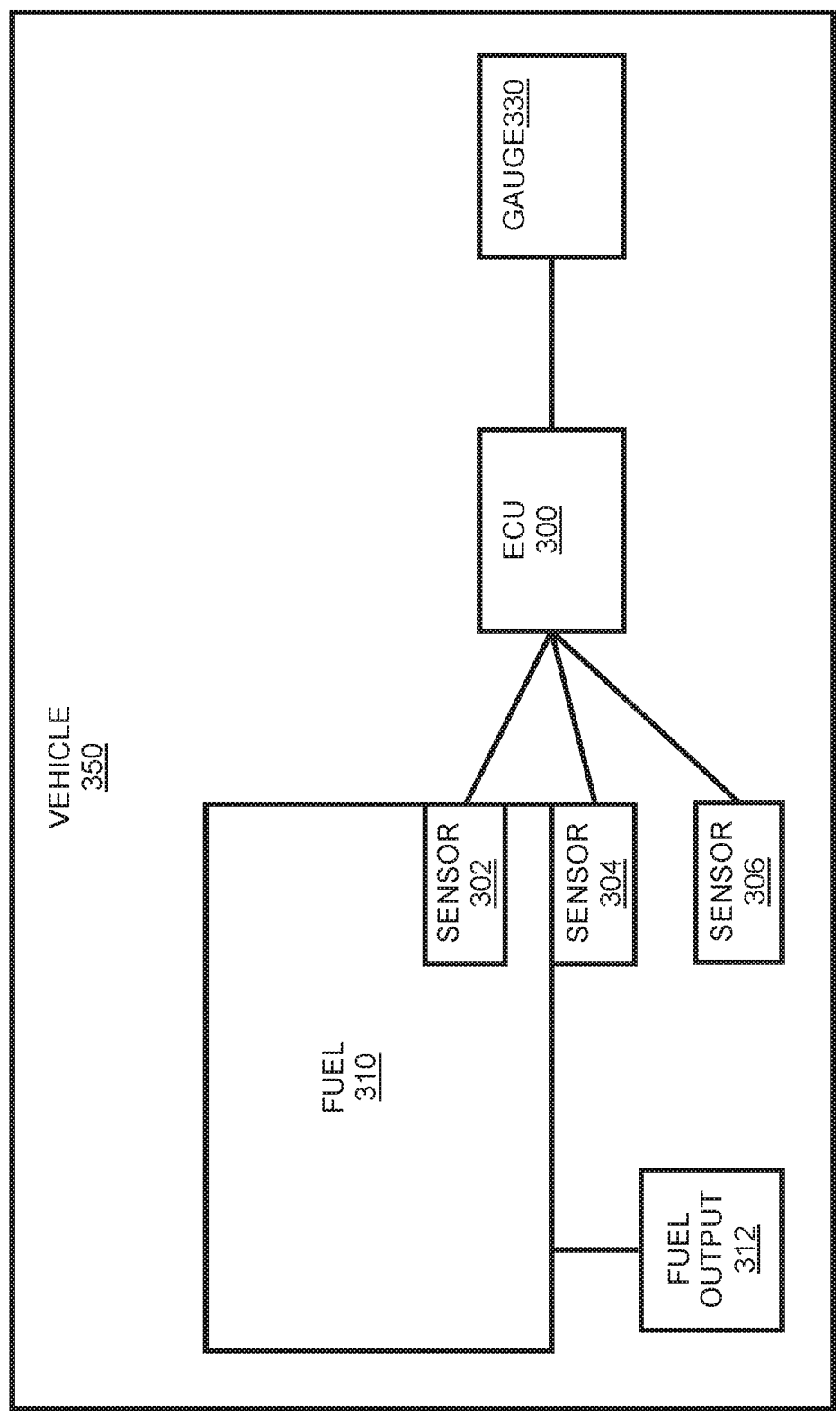
FIG. 3 shows an example of an ECU within a vehicle.

FIG. 3 shows an example of an ECU 300 within a vehicle 350, provided in accordance with an embodiment of the invention. The ECU may be mounted on the vehicle or within the vehicle. The ECU may travel with the vehicle.

A vehicle 350 may be any type of vehicle known in the art. A vehicle may be a truck, such as a light duty truck (e.g., class 1, class 2 or class 3), medium duty truck (e.g., class 4, class 5 or class 6), or heavy duty truck (e.g., class 7 or class 8). In some embodiments, the vehicles may be cars, wagons, vans, buses, high-occupancy vehicles, dump trucks, tractor trailer trucks, or any other vehicles. The same ECU may be capable of interacting with various vehicles or types of vehicle. For example, an ECU may be mounted onto a dump truck, and the same ECU may be capable of being mounted on a bus.

A vehicle 350 may be propelled by a fuel. The fuel may be a gaseous fuel, such as natural gas. The fuel may be contained within a gaseous fuel containing device 310, such as a tank, vessel, or any other type of device capable of containing a gaseous fuel. Any description herein of a fuel tank, vessel, or any other type of gaseous fuel containing device may be applicable to any other type of gaseous fuel containing device. The gaseous fuel containing device may be capable of containing a fuel with a certain amount of pressure. For example, the gaseous fuel containing device may be capable of containing a fuel having less than or equal to about 10000 psi, 8000 psi, 7000 psi, 6500 psi, 6000 psi, 5500 psi, 5000 psi, 4750 psi, 4500 psi, 4250 psi, 4000 psi, 3750 psi, 3500 psi, 3250 psi, 3000 psi, 2750 psi, 2500 psi, 2000 psi, 1500 psi, 1000 psi, 500 psi, 300 psi, 100 psi, or less.

A gaseous fuel containing device 310 may have one or more fuel output 312. The fuel output may transfer the fuel to another part of the vehicle 350, such as an engine. In one example, the fuel may be output to mix with air in the cylinder of an engine. The fuel may be used in the process of propelling the vehicle.

In some embodiments, a vehicle 350 may contain a single gaseous fuel containing device, such as a tank 310. In other embodiments, the vehicle may contain a plurality of tanks. The tanks may or may not have the same characteristics. In some embodiments, the conditions of a single tank or the fuel within the tank may be monitored by a single ECU 300. Alternatively, the conditions of a plurality of tanks or the fuel within the tanks may be monitored by a single ECU. Alternatively, a plurality of ECUs may be used to monitor a single tank (and/or fuel within the tank), or a plurality of tanks (and/or fuel within the tanks).

An ECU 300 may receive signals from one or more sensors 302, 304, 306. The sensors may be within a tank 304, attached to a tank 304, and/or separate from the tank 306. In some examples, a temperature sensor within a tank may capture the temperature of the fuel within the tank. A pressure sensor within a tank may capture the pressure of the fuel within the tank. A temperature sensor attached to the tank may capture the temperature of the tank. The temperature sensor separate from the tank may capture ambient conditions around the tank and/or the temperature of one or more plumbing lines. Any number or combination of such sensors may be used. Any number of sensors or combinations of such sensors may be used for a single tank, or for a plurality of tanks.

The ECU 300 may communicate one or more command to a gauge 330. The command may be provided directly or indirectly to the gauge. One or more additional device may be provided which may convert the proper signal for the gauge. The command to the gauge may be generated based on the signals from one or more of the sensors. The gauge may display a level of fuel. The level of fuel may be for a single tank. The level of fuel may be the overall fuel within the vehicle, which may be distributed over one or more tanks. Alternatively, the level of fuel may be shown separately for each tank of the vehicle. In one example, the gauge may be display the fuel level on a dashboard of the vehicle.

In embodiments with multiple tanks gaseous fuel containing devices (e.g., tanks), one or more sensors may be provided per each gaseous fuel containing device. For example, a first set of temperature and pressure sensors may be provided to monitor temperature/pressure of a first tank, and a second set of temperature and pressure sensors may be provided to monitor temperature/pressure of a second tank.

The ECU may be capable of communicating with various types of sensors and/or gauges. The ECU may be able to compensate for different characteristics of sensors and/or gauges. The ECU may be initialized to operate with a particular set of sensors and/or gauges. The ECU may be re-initialized and/or programmed to operate with a different set of sensors and/or gauges. A user may select characteristics or parameters of the various sensors and/or gauges, thereby enabling the ECU to interact and provide an accurate fuel level reading for the sensors and/or gauges. In some instances, the characteristics or parameters of the various sensors and/or gauges may be automatically detected and updated when the ECU is placed into communication with the sensors and/or gauges.

Figure 4:
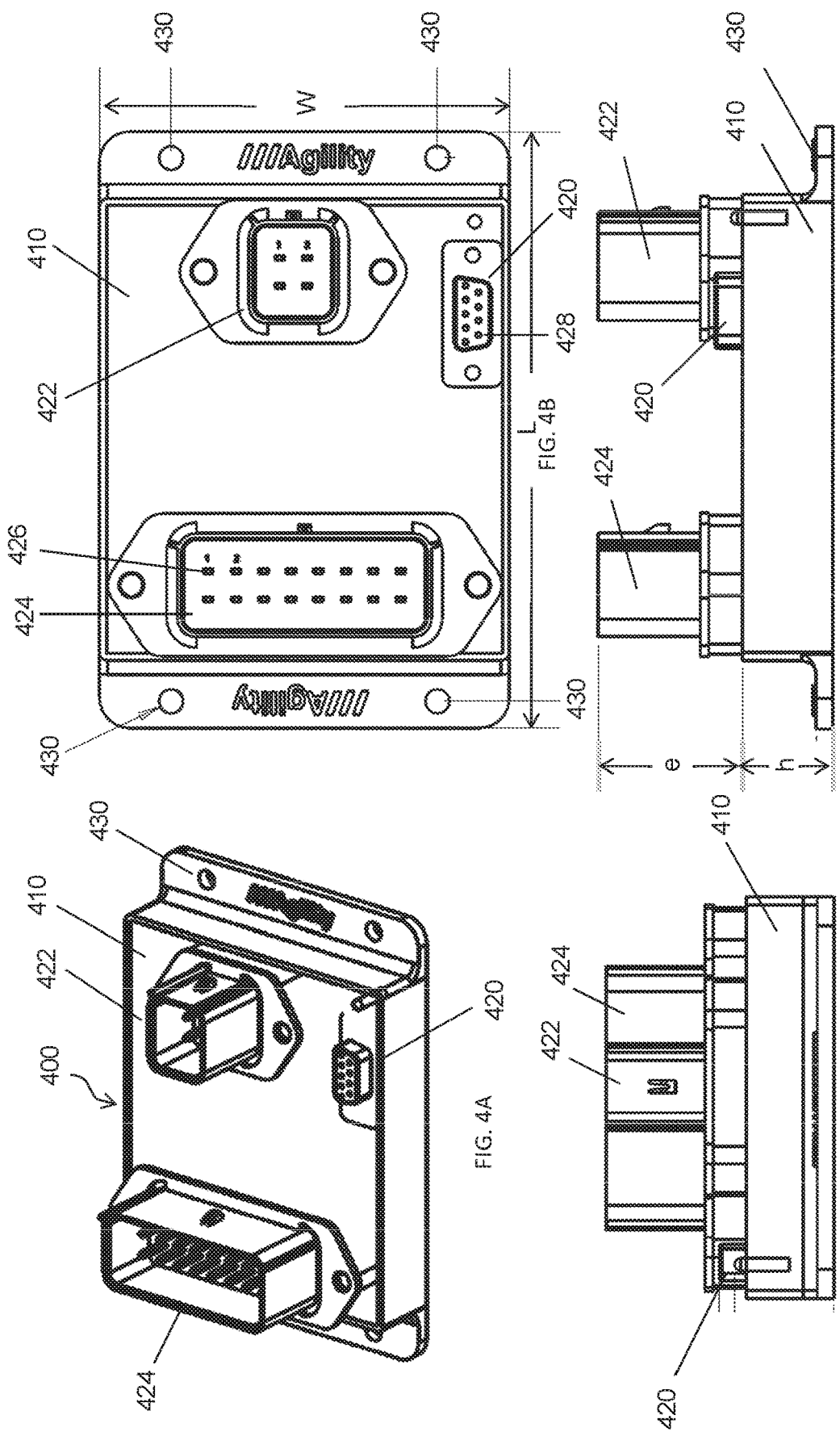
FIG. 4 shows an example of an ECU control box.

FIG. 4 shows an example of an ECU control box 400 in accordance with an embodiment of the invention. FIG. 4A provides a perspective view of the control box. The control box may have a cover 410, which may be a housing, shell, or enclosure.

One or more control box interfaces 420, 422, 424 may be provided. The control box interfaces may permit the control box to be connected to one or more other devices or sensors. The control box may be electrically connected to the one or more other devices or sensors. For example, an initialization control box interface 420 may permit the control box to be connected to an initialization device. A sensor interface 422 may permit the control box to be connected to one or more sensors of a vehicle. A gauge interface 424 may permit the control box to connect to a gauge.

A control box may have one or more attachment features 430 that may permit the control box to be attached to a vehicle in a desired manner. For example, a control box may be screwed onto a surface of a vehicle. A control box may be attached to a vehicle in any manner known in the art, such as screwing, riveting, welding, soldering, brazing, adhesives, interlocking features, hook and loop fasteners, ties, clamps, or any other attachment techniques. The control box may be permanently attached to the vehicle. Alternatively, the control box may be removably attached to the vehicle. The control box may be attached to an exterior surface of the vehicle. In some embodiments, the control box may be provided within a compartment or section of the vehicle. A cover may be provided over the control box. The control box may or may not be exposed.

FIG. 4B provides a top view of the control box. The control box interfaces 420, 422, 424 may be disposed anywhere on the control box. The control box interfaces may be provided on a surface of the control box cover 410. The control box interfaces may be provided at or near edges or sides of the control box. The control box interfaces may all be provided on the same surface or side of the control box cover, or may be provided at different surfaces or sides of the control box cover.

A control box interface may have one or more electrically connecting portion 426, 428. For example, an electrically connecting portion may be a pin 426 that may protrude, or a hole 428 that may be configured to receive a pin. When a pin is inserted into a hole, an electrical connection may be made. Any other electrical connection mechanisms may be used.

The control box interfaces may be shaped to connect with a connector from a respective device. For example, a sensor interface 422 may be configured to receive a connector (e.g., cable, wire, plug, adaptor) from a sensor.

A control box may have any dimensions or shape. In one example, a control box may have a quadrilateral cross-section with a width W and a length L. A control box may have any other shape, such as a circle, ellipse, pentagon, hexagon, or octagon. A dimension of the control box, such as a width, length, diagonal, or diameter, may have any value, which may be greater than, less than, equal to one or more of the following, and/or fall between two or more of the following: 1 mm, 1 cm, 1.5 cm, 2 cm, 2.5 cm, 3 cm, 4 cm, 5 cm, 6 cm, 7 cm, 8 cm, 9 cm, 10 cm, 12 cm, 15 cm, 20 cm, 25 cm, 30 cm, or 50 cm.

FIG. 4C shows a side view of the control box. A connection interface 420, 422, 424 may protrude or extend from the control box cover 410. In alternate embodiments, the connection interface may be flush with the cover, or may be depressed within the cover. In alternate embodiments, a control box may communicate with another device (e.g., sensor, gauge, initialization device) wirelessly. A wireless communication module, which may permit such communications, may be provided within the housing of the control box, or on the housing of the control box. Any combination of connection interface configurations may be used.

FIG. 4D shows a side view of another side of the control box. As previously described, a connection interface 420, 422, 424 may optionally protrude from the control box cover 410. Space may or may not be provided between the connection interfaces. A control box cover may have any height h which may be greater than, less than, equal to one or more of the following, and/or fall between two or more of the following: 1 mm, 3 mm, 5 mm, 7 mm, 1 cm, 1.2 cm, 1.5 cm, 2 cm, 2.5 cm, 3 cm, 3.5 cm, 4 cm, 5 cm, 6 cm, 7 cm, 8 cm, 9 cm, or 10 cm. A connection interface may extend from the surface by any amount e which may be greater than, less than, equal to one or more of the following, and/or fall between two or more of the following: 1 mm, 3 mm, 5 mm, 7 mm, 1 cm, 1.2 cm, 1.5 cm, 2 cm, 2.5 cm, 3 cm, 3.5 cm, 4 cm, 5 cm, 6 cm, 7 cm, 8 cm, 9 cm, or 10 cm. The extension of an interface may be greater than, less than, or equal to about the height of the control box.

Figure 5:
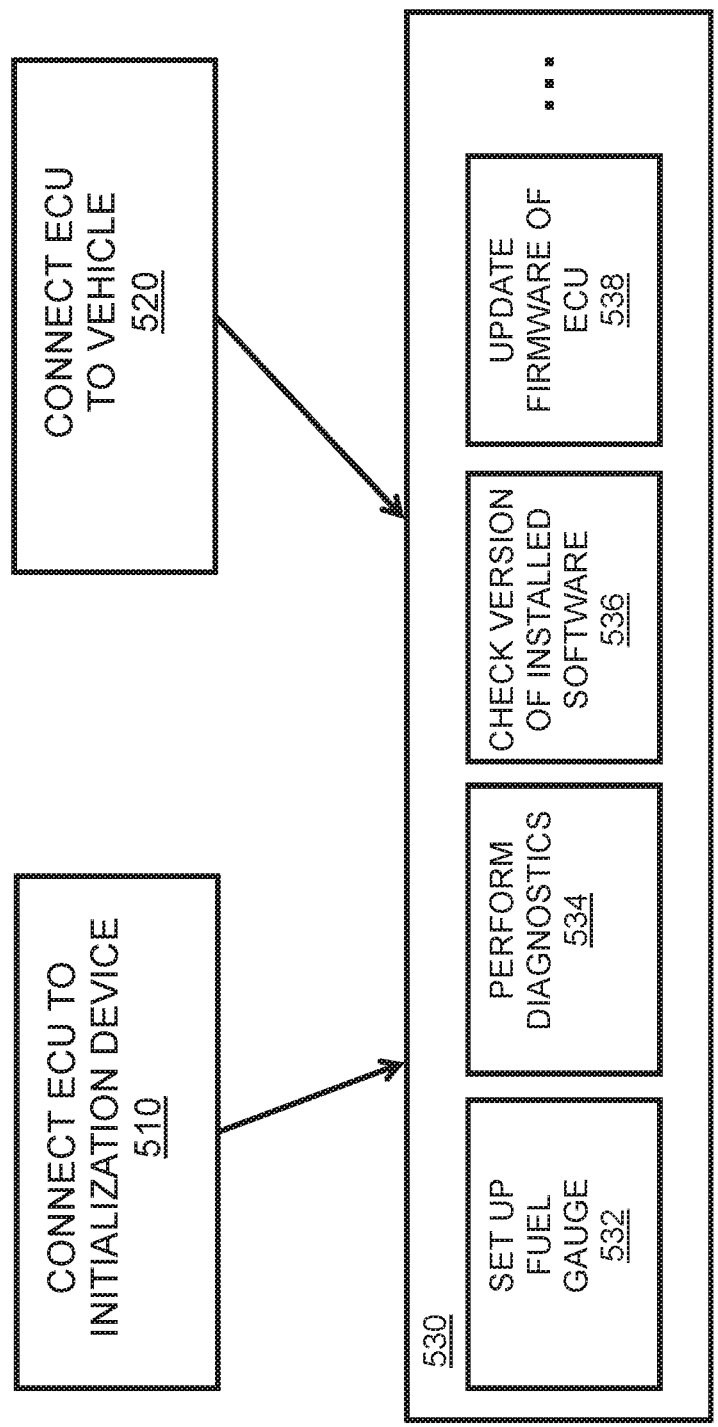
FIG. 5 shows an example of method of performing initial, calibration, or maintenance steps with the ECU.

FIG. 5 shows an example of a method for performing initial, calibration, or maintenance steps with the ECU in accordance with an embodiment of the invention. In some instances, initialization may occur prior to the operation of a vehicle. Initialization may occur while a vehicle is off (e.g., key off). Alternatively, initialization may occur while a vehicle is on or in operation.

An ECU may be connected to an initialization device 510. Examples of an initialization device may include a personal computer, such as a desktop or laptop computer, server, tablet, mobile device (e.g., smartphone, cellular phone, personal digital assistant, pager), or any other device that may be capable of performing an initialization of the ECU.

The ECU may be connected to the initialization device via a wired connection, or wirelessly. In one example, a cable, wire, plug, or adaptor may be used to connect the ECU to the initialization device. For example, the ECU may be connected to the initialization device via a USB to TTL Serial cable (e.g., with a DB9 connector). The ECU may or may not be receiving power from the initialization device.

The ECU may also be connected to a vehicle 520. The ECU may be connected to the vehicle at any time, e.g., the ECU may be connected to the vehicle before being connected to the initialization device, after being connected to the initialization device, or simultaneously with being connected to the initialization device. The ECU may be connected to the vehicle via a wired connection, or wirelessly. In one example, a cable, wire, plug, or adaptor may be used to connect the ECU to the initialization device. For example, the ECU may be connected to the initialization device via an SAE J1128-18 AWG or automotive wires 18 AWG.

The ECU may be connected to the vehicle and may provide communication with one or more portion of the vehicle. For example, the ECU may be electrically communicating with a sensor of the vehicle. The ECU may be electrically communicating with a gauge of the vehicle. In some examples, the ECU may be electrically connected to a sensor of the vehicle and electrically connected to a gauge of the vehicle, the ECU may be electrically connected to the sensor without being electrically connected to the gauge, electrically connected to the gauge without being electrically connected to the sensor, or not electrically connected to the sensor and not electrically connected to the gauge. The ECU may be electrically connected to the vehicle and may or may not receive power from the vehicle. An example of an electrical connection interface for the ECU is provided in FIG. 6 which will be described in greater detail below.

One or more initialization step 530 may occur involving the ECU. An initialization device may send one or more instructions to the ECU to perform the initialization step. The initialization device may receive information from the ECU (e.g., information received from a sensor and/or gauge of the vehicle, or provided to a gauge of the vehicle). The initialization device may be capable of two-way communications with the ECU. An initialization device may include a user interface that may display collected information, and/or accept a command from a user.

Examples of initialization steps may include setting up a fuel gauge 532, performing diagnostics 534, checking version of installed software 536, or updating the firmware of the ECU 538. Such initialization steps may be performed while a vehicle is not in operation. Alternatively, one or more of the steps may be performed while the vehicle is in operation. Such initialization steps may be performed periodically, or upon a detected event. Such initialization steps may provide initial, calibration, or maintenance steps with the ECU.

Setting up a fuel gauge 532 is described in further detail elsewhere herein. Setting up a fuel gauge may include determining a filling compensation scheme. A filling compensation scheme may be selected from a plurality of options. Setting up a fuel gauge may assist with permitting an ECU to accurately provide a fuel level to a gauge. This may be performed by determining characteristics and/or parameters of various sensors and/or gauges. This may permit an accurate or desired fuel level to be displayed on the gauge, for various gauge configurations or sensor configurations. The ECU may be able to adapt for different sensors and/or gauges.

Performing diagnostics 534 may include receiving one or more signal through the ECU. The signals received from the ECU may include signals received from one or more sensors. For example, diagnostics may test whether pressure and temperature sensor wires are correctly connected. The diagnostics may determine whether one or more wires of the sensors are disconnected (e.g., open circuit). The diagnostics may also determine whether there is a short circuit for the sensor wires.

In addition to checking the sensors, a calibration file name may be checked. Parameters may be checked based on reading pressure and comparing it with a mechanical pressure sensor. Furthermore a gauge may be checked. Signals received may be checked with the dash gauge reading.

Checking the version of the installed software 536 may include running a program which may check the version of the software installed on the initialization device. In an alternative embodiment, checking the version of installed software may also check on a program which may be provided or installed on an ECU. In some embodiments, if updates to the software are available, an option may be provided to update the software. An update to the software may be automatically initiated, or may await user confirmation prior to occurring.

In some embodiments, the latest version of firmware on the ECU may be checked and/or displayed.

Updating the firmware of the ECU 538 may include uploading a new updated firmware to the ECU. This may occur after adding or modifying a software on an initialization device. The new firmware may be delivered through the initialization device to the ECU. Alternatively, additional devices may be used to deliver new firmware to the ECU. In one example, an AVR ISP programmer, compatible with Amtel STK-300 (development board), for instance AVR ISP-U or AVR-ISP500, and/or AVR software may be used.

Figure 6:
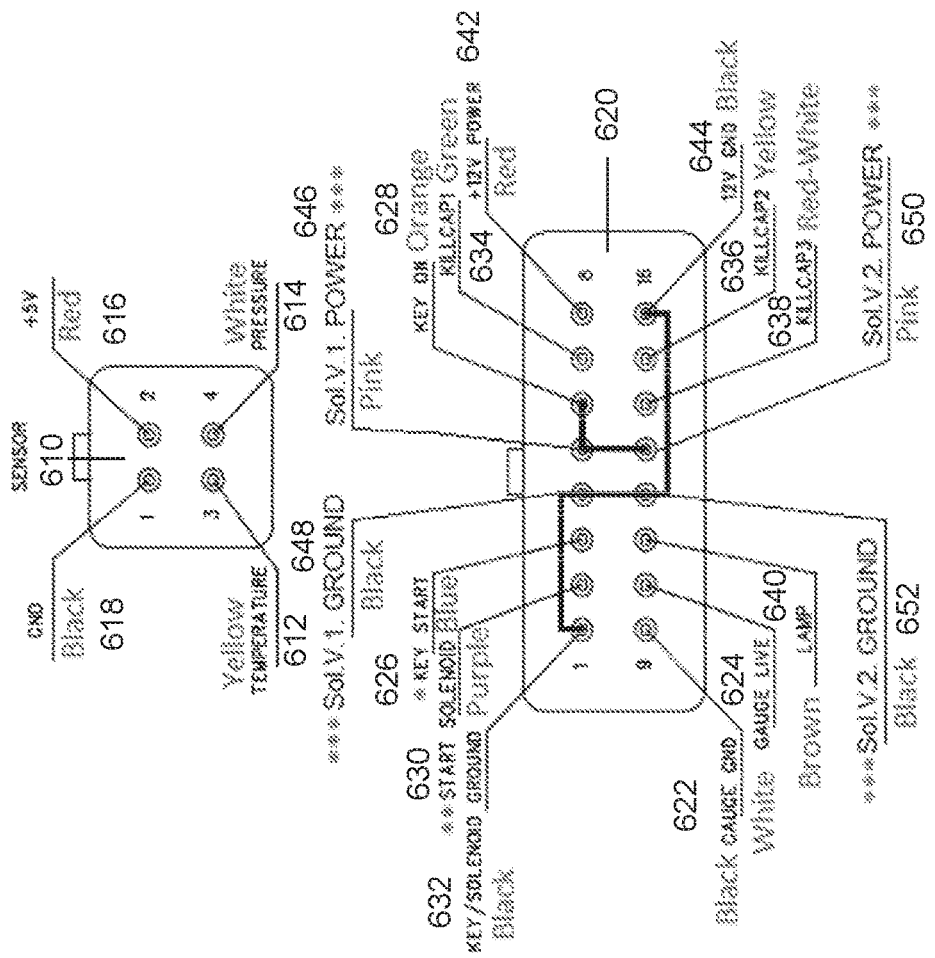
FIG. 6 shows an example of connections for an ECU to a vehicle.

FIG. 6 shows an example of connections for an ECU to a vehicle. Such connections are provided by way of example only. The locations and/or orders of the connections may be varied.

A sensor connection interface 610 may be provided. A first connection 612 may receive a signal from a temperature sensor, and a second connection 614 may receive a signal from a pressure sensor. Any number of connections may be provided, corresponding to any number or types of sensors. A third connection 616 may be provided for power (e.g., +5V, or any other voltage value), and a fourth connection 618 may be provided for ground.

A gauge connection interface 620 may be provided. The interface may include a gauge ground 622 and gauge live 624 connection. A signal may be provided to the gauge from the ECU and/or received by the ECU from the gauge through such connections. The interface may further include a key start connection 626, key on connection 628, a start solenoid connection 630, and/or a key/solenoid ground connection 632. Such connections may be useful for determining whether a vehicle is in operation or not (e.g., whether a key has been turned in an ignition). A solenoid connection may activate a high pressure solenoid valve in order to start an engine or feed the engine of a vehicle. One or more kill cap connections, such as a first kill cap connection 634, second kill cap connection 636, and/or third kill cap 638 connection may also be provided. Kill caps may be safety switches, so if their signals are not ok (e.g., not in an acceptable range), the ECU may not allow the engine to be cranked. This may be a safety matter for fueling a vehicle, when the dispenser is connected to a gas tank of the vehicle. One or more power and ground connections 642, 644, 646, 648, 650, 652 may also be provided. Optionally, a lamp connection 640 may be included. The lamp may be a low fuel warning lamp. When the amount of fuel is lower than a specified amount, the ECU may turn the lamp on. The lamp may also be used for providing an alert to a driver for leakage (e.g., blinking light) and service alarm (e.g., slower blinking light). Alternatively, other alert mechanisms may be used. The lamp may be integrated in the dash gauge or in a cluster.

Figure 7:
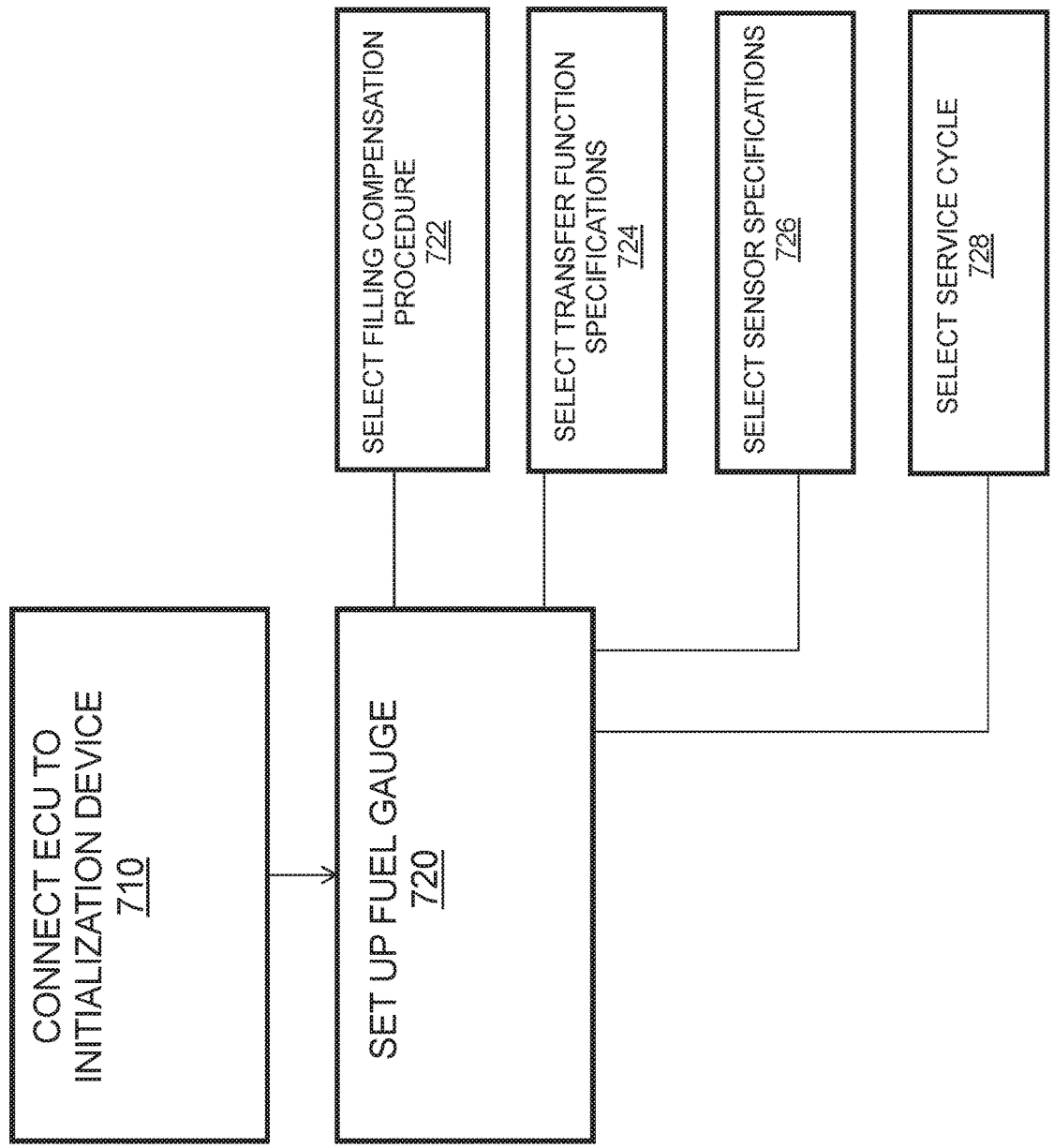
FIG. 7 shows an example of method of performing initial, calibration, or maintenance steps with the ECU.

FIG. 7 shows an example of a method for performing initial, calibration, or maintenance steps with an ECU in accordance with an embodiment of the invention. An ECU may be connected to an initialization device 710. The ECU may be connected to the initialization device in any manner, as described elsewhere herein.

A fuel gauge set-up 720 may occur. Setting up the fuel gauge may include one or more of the following steps: selecting a filling compensation procedure 722, selecting transfer function specifications 724, selecting sensor specifications 726, and selecting a service cycle 728. These steps may occur in any order or may have a predetermined order. Any of these steps may be optional or additional steps may be provided.

Selecting a filling compensation procedure 722 may include selecting a filling compensation scheme from a plurality of possible filling compensation schemes. For example, one, two, three, four or more options may be provided for filling compensation schemes. A filling compensation scheme may be selected from the plurality. Examples of possible filling compensation schemes may include none, temperature-based compensation, fuel-based compensation, or time-based compensation. A plurality of filling compensation schemes include two or more of the following: no special correction measurements; gas pressure compensated based on ambient temperature; compensation based on filling speed and keeping maximum pressure and reducing it by fuel consumption up to threshold pressure; compensation based on filling and reducing the pressure by the time when the key is on. A filling compensated may be provided when filling the tank with fuel, or after the vehicle has been fueled and is in operation.

When the "none" option (e.g., no special correction measurements option) is selected, the ECU may just take the true pressure sensor values, and based on those values send a command to the gauge. For example, regardless of the temperature or other conditions, a pressure reading from one or more pressure sensor may be utilized as the pressure value for the gaseous fuel tank. For example if Pg is the pressure sent to the gauge, Ps is the gas pressure from the sensor, Pg=Ps.

When a temperature-based compensation is selected, gas pressure may be compensated based on temperature. This may be the temperature measured within a tank, the temperature of the tank, the temperature of one or more plumbing lines, or ambient temperature external to the tank. For example, as the temperature changes throughout the day, this may cause the pressure of the gas within the tank to change, even if the amount of available energy (e.g., gas) is not changing. In one instance, if the temperature, e.g., ambient temperature is Ta, and a gas temperature is Ts, if Ta<=Ts, then Pg=Pt, where Pt is the compensated gas pressure based on ambient temperature. If Ta>Ts, then Pg=Ps. In another instance, Pg=Pt regardless of relative temperature conditions. The compensated gas pressure Pt may be calculated based on the ideal gas law (e.g., PV=nRT). For example, Pt may be calculated as follows:

$Pt=Ps \times (Ta+273.15)/(Ts+273.15)$

With a fuel-based compensation, the ECU may compensate based on filling speed. This may occur when keeping maximum pressure and reducing it by fuel consumption up to "threshold pressure." In one summary example, Pg>Pt when Pt>threshold, and Pg=Pt when Pt<=threshold, where Pg=pressure sent to gauge, Pt=ambient temperature compensated pressure.

Figure 9:
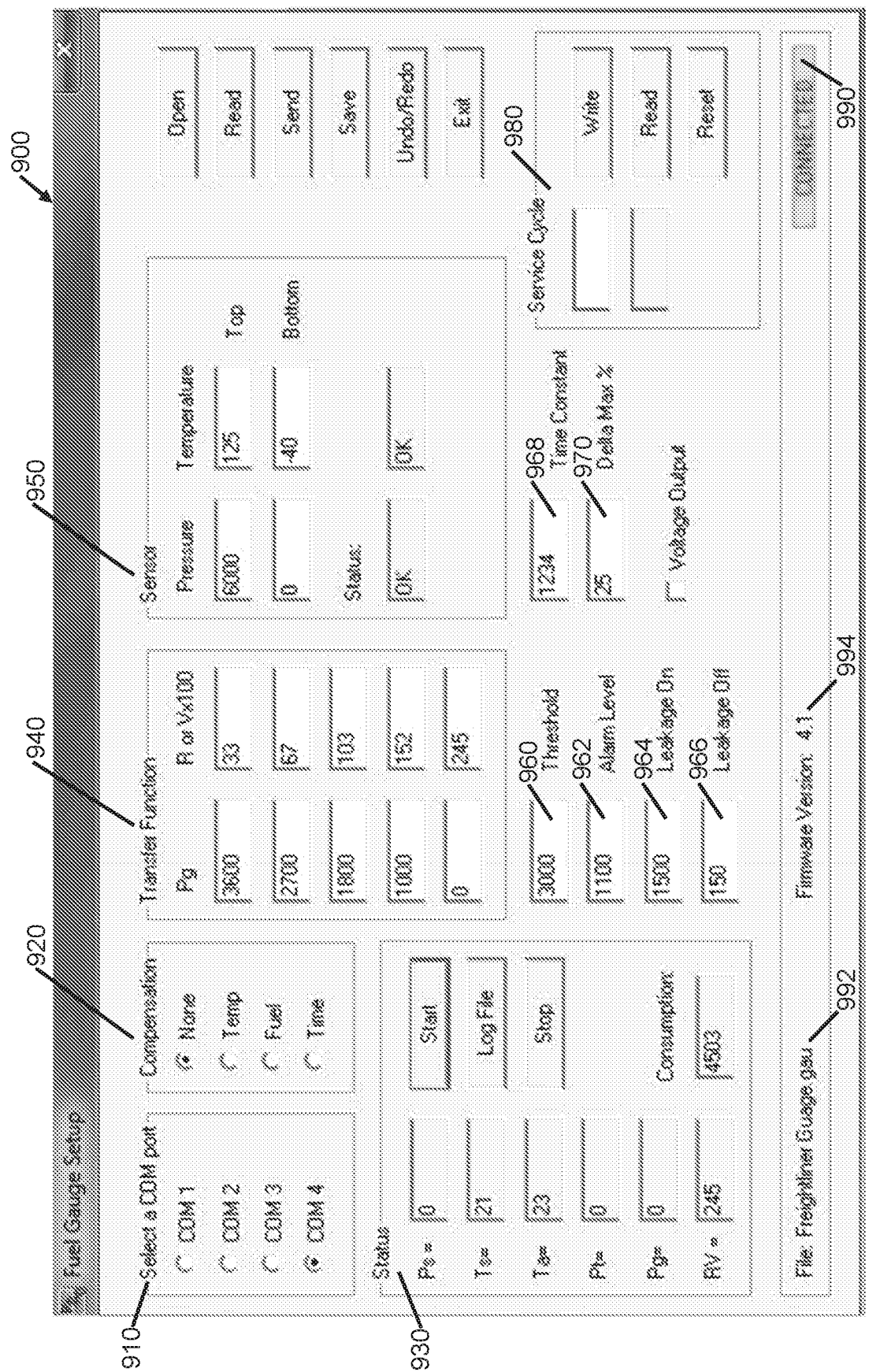
FIG. 9 shows an example of a user interface for fuel gauge set-up.

The maximum pressure Pmax from the last filling may be saved in the memory of the ECU, and the ECU may send the maximum pressure to the gauge. In one example, FIG. 9 provides a value of 3600 psi for the Pmax. During gas consumption, the ECU may compensate the pressure by a factor of deviation from a threshold value. The threshold value may be provided on a user interface and may be entered by a user or may be generated automatically or based on a measurement. A default threshold value may be offered. The default threshold value may or may not depend on one or more selected or measured values. For example, FIG. 9 provides an example where the threshold value is 3000 psi.

When the tanks are filled rapidly and gas temperature inside the tanks increase, after some time has passed if no fuel is consumed, the gas temperature and gas pressure within the tanks may drop. This may lead to an operator of a vehicle erroneously thinking that there is a leak in the system because of the pressure/temperature drop without gas consumption. However, this drop may be due to temperature drop after rapid filling. Alternatively, temperature/pressure drop may occur with drop in ambient temperature Ta.

A compensation factor K may be calculated to determine how a pressure value needs to be modified. A pressure value sent to the gauge Pg may be calculated as follows:

$Pg=Pt+K \times \Delta P$ where Pg=gauge pressure, Pt=ambient temperature compensated pressure, K=compensation factor, and ΔP=Pmax−Ptmax, where Ptmax=Pt at maximum filling.

A compensation factor K may be determined based the maximum filling pressure Pmax, ambient temperature compensated pressure Pt, and threshold value.

$K=(Pt-\text{threshold})/(P\text{max}-\text{threshold})$

When the deviation between the temperature compensated pressure Pt and maximum filling pressure Pmax is zero, K=1. When the deviation between the temperature compensated pressure Pt and the maximum filling pressure Pmax is equal to the difference between Pmax and the threshold (e.g. Pt=threshold), K=0. So for example, if Pmax=3600 psi, threshold=3000 psi, and Pt=3600 psi, K=1. If Pt=3400 psi, K=⅔. If Pt=3200 psi, K=⅓. If Pt=3000 psi, K=0.

In one example, suppose the tank is initially filled to a pressure value, e.g., 3600 psi. After the temperature drops, Ta=Ts, suppose Pmax=3600 psi, threshold=3000 psi, and Pt=3400 psi. If no gas has been consumed at this point, Ptmax=3400. Then the compensation factor can be calculated K=⅔. Pg=3400+(⅔)×(3600−3400)=approximately 3533 psi. After gas is consumed, Pt may drop to 3200 psi.

Then Pg=3200+(⅓)×(3600−3400)=approximately 3267 psi. When Pt=3000 psi, K=0, and Pg=Pt.

When a time-based compensation is selected, a compensation is made based on filling and reducing it by the time a key is on (e.g., vehicle engine has started), a maximum time defined as a time constant, and a maximum value added to pressure defined as delta max %. In one example, Pg>Pt when time of key on<=time constant, and Pg=Pt when time of key on>time constant.

A time constant may be defined. The time constant may be provided in seconds, e.g., 1234 seconds as shown in FIG. 9, or any other unit of time. The time constant may be entered by a user, or may be automatically generated or based on a measurement. A default time constant may be provided. The time constant may represent the length of time after maximum filling pressure is achieved. For example, fuel may be provided into a tank and the pressure may rise until a maximum filling pressure is achieved. After some time, even if no gas is consumed, the pressure and/or temperature of the gas may decrease. The time constant may look at the length of time after the max pressure is achieved and during which a decrease occurs.

A delta max % may be defined. The delta max % may be provided as a percentage, e.g., 0% as shown in FIG. 9, or 25% in another example. The delta max % may be entered by a user, or may be automatically generated or based on a measurement. A default delta max % may be provided. The delta max % may be a value that may be added to a Pt during a period defined by the time constant.

A pressure value provided to a gauge Pg may be defined under time-based compensation as follows:

$$Pg=Pt\times(1+\text{delta max }\%) \text{ while within time constant after max pressure}$$

For example, if time constant=1234 seconds, and delta max=25%, when Pt=3400, Pg=3400×(1.25)=4250 psi and till 1234 seconds after key on, this percentage will be added. So if at t=1233 seconds, Pt=3000 psi, then Pg=3000*(1.25) =3750 psi, but just after t>1234 seconds, Pg=Pt.

In some embodiments, a compensation scheme may include using an ideal gas law to determine the amount of fuel in a tank. Logic may be provided that may include non-linear compressibility of gas. One or more other algorithm or calculation may also be performed to determine the amount of fuel in a tank. In some instances, ambient temperature may be a factor that may be used with preset logic to determine the output signal to the gauge. A look-up table or other records may be used for gauge linearity correction. Alternatively, gain setting using interpolation may be used. In some instances, a look-up table is not used for determining an output signal to a gauge. Using calculations based on physical principles may advantageously not require the type of calibration that a look-up table would. For example, utilization of algorithms may not need special calibration since it is based on the relationship between amount of gas, temperature and pressure that may remain true. The use of look-up tables instead of such calculations may require look-up tables for every particular tank, sensor and maximum pressure by experiment.

In some instances, a D/A (digital to analog) converter may be implemented using switched resistors. Such techniques may or may not be utilizing complex components. Such techniques may provide a result to derive resistor gauges.

Setting up a fuel gauge may also include selecting transfer function specifications 724. Setting up a transfer function specification may include receiving one or more input from a user, and/or permitting automated detection of one or more value. Such specifications may reflect characteristics and/or parameters for gauges, and/or other settings for compensation schemes and/or alerts for the vehicle. Selecting sensor specifications 726 may include receiving one or more input from a user and/or permitting automated detection of one or more value. Such specifications may reflect characteristics and/or parameters for sensors. Selecting a service cycle 728 may permit an input from a user. The user may input a desired number of filling cycles to be completed before providing an alert for a service. Additional details are provided elsewhere herein.

The ECU may be in communication with temperature sensors in and/or on one or more tanks, fuel management components present in the fuel system, fuel control components along plumbing lines and/or with one or more ambient temperature sensors. The temperature sensors may dynamically provide the ECU with the temperature of the gas in the one or more tanks, fuel management components, along plumbing lines and/or the outside air temperature. The ECU may further be in communication with one or more pressure sensors of the disclosure. As described in greater detail elsewhere herein, temperature compensation of the pressure measurement(s) may be provided to determine the final resting pressure after the gas cools during filling. As the fuel system cools to ambient temperature, the system pressure may go down to a nominal full pressure which is lower that the full pressure at the end of filling. The dynamic temperature measurements may enable the resting pressure to be determined throughout the filling process. The determination of the final resting pressure based on the temperature provided by the dynamic temperature sensors may be utilized to initially fill the tanks to a higher pressure, such that a resting pressure closer to a maximum allowable system pressure is achieved. This may allow more fuel to be provided to the system during filling, thus extending the range of driving until the next refueling. Further, the dynamic temperature sensors enable more accurate gauge readings (e.g., the gauge readings can have better time resolution).

As described elsewhere herein, the ECU may be in communication with a filling station. For example, if the ECU is in communication with a filing station during filling, data regarding the resting pressure and/or instructions regarding target full pressure at the end of filling may be transmitted to the filling station. The ECU may communicate to the filling station to fill the one or more tanks to a higher pressure than the nominal full pressure. For example, the ECU may communicate to the filling station to fill the one or more tanks to a higher pressure than the nominal full pressure based on temperature compensation of pressure enabled by the dynamic temperature sensor described previously.

Figure 8:
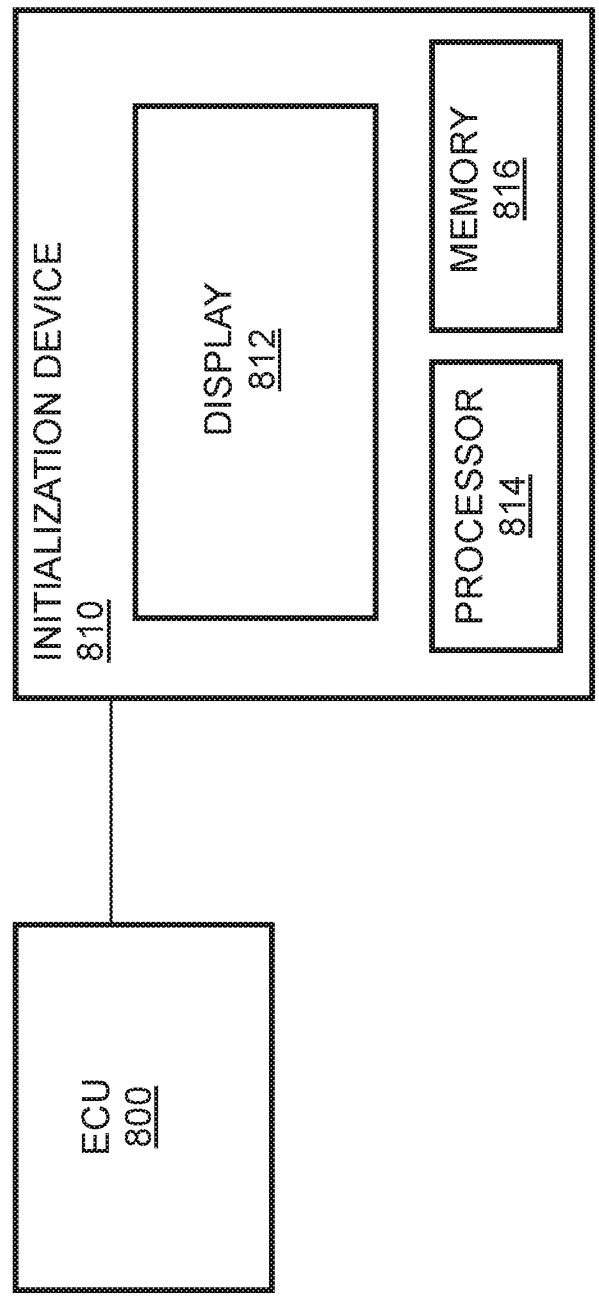
FIG. 8 shows an example of an ECU in communication with an initialization device.

FIG. 8 shows an example of an ECU 800 in communication with an initialization device 810. As previously described, an ECU may be connected to the initialization device via a wired connection. Alternatively, the ECU may be connected to the initialization device wirelessly. The ECU may be connected to the initialization device over a network, such as a local-area network, or a wide-area network, such as the Internet. The ECU may be connected to the initialization device over a telecommunications network, such as a cell phone or data network. The initialization device may be a mobile device (e.g., cell phone), or may be controlled by a mobile device (e.g., cell phone). The ECU may be connected to a single initialization device at a time. Alternatively, the ECU may be capable of connecting to a plurality of initialization devices simultaneously.

An initialization device 810 may have a display 812. The display may be capable of displaying information. The display may be capable of showing a user interface, such as a graphical user interface. An example of a user interface is provided in FIG. 9 which is described further elsewhere herein. A display may be any display known in the art including, but not limited to, a cathode ray tube, a liquid crystal display, a plasma screen, a touchscreen, a projection screen, an LED screen, or an OLED display.

The initialization device 810 may include one or more processor 814 and/or memory 816. The processor may be capable of executing one or more step. One or more steps may occur as dictated by one or more set of rules. The rules may dictate when a user performs one or more steps, or when a machine automatically performs one or more steps. The rules may permit automated electricity delivery management based on a set of one or more conditions. The device may have memory that may include non-transitory and/or tangible computer readable media which may contain instructions, logic, data, or code that may be stored in persistent or temporary memory of the computer or other device, or may somehow affect or initiate action by the computer or other device. The memory may include one or more databases.

The initialization device may be capable of accessing remote information, such as information stored in memory of the initialization device. The initialization device may access information stored in remote devices, such as servers, databases, and/or information provided on a cloud-computing based infrastructure. The initialization device may comprise a communication unit that may be capable of communication with remote devices. Two-way communications may be provided. Such communications may occur directly or over a network. Such communications may be wired or wireless.

A user may be capable of interacting with the initialization device. The user may be capable of viewing information through the display. The device may be capable of receiving an input from a user. The user may provide an input via a user interactive device including but not limited to a keyboard, mouse, touchscreen, trackball, touchpad, joystick, wand, audio recognition device, gesture recognition device, optical sensors, or any other user interactive device. The user may be capable of inputting one or more value that may be pertinent to the initialization and/or operation of the ECU. The initialization device may receive an instruction from a user and/or remote device, or may generate instructions, which may be provided to the ECU.

In one example, communications may be provided between the ECU and the initialization device when one or more initialization step is performed. For example, a communication connection may be provided between the ECU and initialization device when setting up a fuel gauge, performing diagnostics, checking a version of installed software, updating firmware of the ECU, or any other initialization steps. In some embodiments, communications are established between the ECU and initialization device when the vehicle is not in operation (e.g., key off), and not when the vehicle is in operation (e.g., key on). Alternatively, the communications may be established between the ECU and initialization device while the vehicle is in operation.

An initialization device may be provided separately from the ECU. Alternatively, in some embodiments, one or more features, components or functionalities of the initialization device may be incorporated within the ECU. For example, the ECU may include a display that may show a user interface. A user may be capable of interacting directly with the ECU. The user may provide a user selection of a compensation scheme directly to the ECU. Any description herein of an action performed by the initialization device may be performed by the ECU. For example, the ECU may comprise a communication unit that may be capable of communication with remote devices, such as servers, databases, and/or information provided on a cloud-computing based infrastructure. Two-way communications may be provided. Such communications may occur directly or over a network. Such communications may be wired or wireless. The ECU may be able to communicate with one or more filling stations, for example, over a network, such as a telecommunications network (e.g., a cell phone or data network). In some embodiments, the ECU may communicate with one or more other ECUs. A network of ECUs may have a hierarchical structure (e.g., a parent or master ECU may communicate with one or more child or slave ECUs).

FIG. 9 shows an example of a user interface 900 for fuel gauge set-up in accordance with an embodiment of the invention. The user interface may be displayed on a display of an initialization device. The user interface may be displayed during a fuel gauge set-up, such as during the fuel gauge set-up procedures or other initialization steps mentioned elsewhere herein.

The user interface 900 may include an option to select a COM port 910. In other embodiments, any sort of selection of a serial port, or port for communication may be provided. In some instances, a default com port, such as COM 4 may be provided. After a COM port has been selected, the user may select an option to "Read." If the power is not connected, an error may be provided. If a cable or other connector to the initialization device is not connected, or a different COM number is being used, another error may be provided. If the initialization device and the ECU are properly connected, certain values, such as those within the transfer function 940 or sensor 950 groups may be automatically filled in. Additional values may also be filled in.

The user interface 900 may include an option to select a filling compensation procedure 920. Any number of filling options may be provided, which may include one or more, two or more, three or more, four or more, five or more, eight or more, or ten or more options. Examples of filling compensation procedures may include none, temperature, fuel, or time, as described in greater detail elsewhere herein. The user may select the desired compensation procedure from a list or group of options. An option may be provided for the user to "Start." Additional information, such as parameter values (e.g., from a status group 930) may be displayed. Examples of additional information, such as filename 992 and firmware version 994 may also be displayed.

A status group 930 may be displayed on the user interface. When a user selects an option to start, internal variables and/or sensor statuses may be visible. For example, information from sensors, such as gas pressure (Ps), gas temperature (Ts), or ambient temperature (Ta) may be displayed. Additional information which may be calculated based on sensor values, selected options (e.g., filling compensation scheme), user-entered values (e.g., threshold), and/or any other additional values, may be displayed (e.g., compensated gas pressure based on ambient temperature (Pt), amount of pressure to be sent to the gauge (Pg), calculated signal for gauge (RV)).

The user interface may also provide the display of a transfer function group 940. The transfer group may accept user inputs. In some instances, default values may be provided. Default values may be provided depending on software, previously-entered values, information from sensors, and/or any other source. Descriptions of user-entered data may or may not have initial default values. A user may be able to set pressure values, resistor values, and/or voltage values. In some embodiments, the user may enter values depending on the type of vehicle.

A user may also be able to set a threshold 960. The threshold value may be useful for certain filling compensation schemes, as described elsewhere herein. Gauge values to be displayed, above the threshold may be compensated, while values below the threshold may be true values. A user may also be able to select an alarm level 962. The alarm level sets the low fuel warning lamp threshold in psi. For example, if the pressure of the tank drops below the alarm level, a warning light or other form of alert may be provided to an operator of the vehicle.

Another example of a user-selected value is a leakage on 964. The leakage on value sets a maximum pressure reduction value in psi/hour for run mode. For instance, a run mode may refer to when a vehicle is in operation (e.g., key on). If the pressure value within a fuel tank decreases at a rate (unit pressure/unit time) that exceeds the leakage on value, a leak may be detected. A warning, such as a blinking light, audio warning, or any other type of perceptible warning may be provided to an operator of the vehicle. A user may also select a leakage off 966 value. The leakage off value may set the maximum threshold pressure reduction value in psi/hour for key off mode. For instance, a key off mode may refer to when a vehicle is not in operation (e.g., no key turned in ignition). If the pressure value within a fuel tank decreases at a rate (unit pressure/unit time) that exceeds the leakage off value while the vehicle is not in operation, a leak may be detected. A warning, such as a blinking light, audio warning, or any other type of perceptible warning may be provided to an operator of the vehicle.

A time constant 968 value may be provided by a user. The time constant value may be useful for certain filling compensation schemes, as described elsewhere herein. For instance, the time constant may be the time in which compensation becomes zero in time mode. A delta max % 970 may be entered by a user, and may be used in certain filling compensation schemes. The delta max % may be a maximum allowed difference between true and compensated values in time mode.

A voltage output option may be provided. A user may or may not select the voltage output option. When selected, the gauge output may be voltage type output. When unchecked, the gauge output may be resistance type output.

A sensor group 950 may be displayed on a user interface 900. Sensor specifications may be entered by a user. Examples of sensor specifications may include pressure values and temperature values. The sensors specifications may define any sensor range (e.g., if a customer or product needs 8,000 psi, a 8,000 psi pressure sensor may be chosen, and by putting 8,000 psi as the upper limit, the new sensor may be defined to the ECU). A status may be displayed. The status may show the status of one or more sensor. For example, if no error is detected, the status may show OK. If an open circuit of a sensor is detected (e.g., not connected properly with ECU), the status may indicate a circuit is open. If a short circuit is detected, the status may indicate that a short circuit exists.

A user interface may also include a service cycle group 980. A user may be able to define a number of cycles of filling after which the ECU may alert an operator of the vehicle to service the vehicle. A user may define the number of service cycles by entering a value and selecting a "write" option. A user may select a "read" function to see the current cycle. A user may select a "reset" option to reset the count after performing a service. For example, a user may define that after 50 filling cycles, the operator should get the vehicle serviced. The user may be able to check and see that the vehicle is currently on cycle 33. Any type of visual display of the current filling cycle may be provided, to show how far along the vehicle is in the process. An alert to the vehicle operator may include a blinking light, audio alert, or any other type of alert. In one example, an alert may be provided through the low fuel warning lamp, but may blink at a specified rate. For example, the low fuel warning lamp may show a steady light when the fuel level in the tank is low, may blink at a first rate when a leak is detected based on pressure drop, and may blink at a second rate when the time for service has arrived, or any combination thereof.

Figure 10:
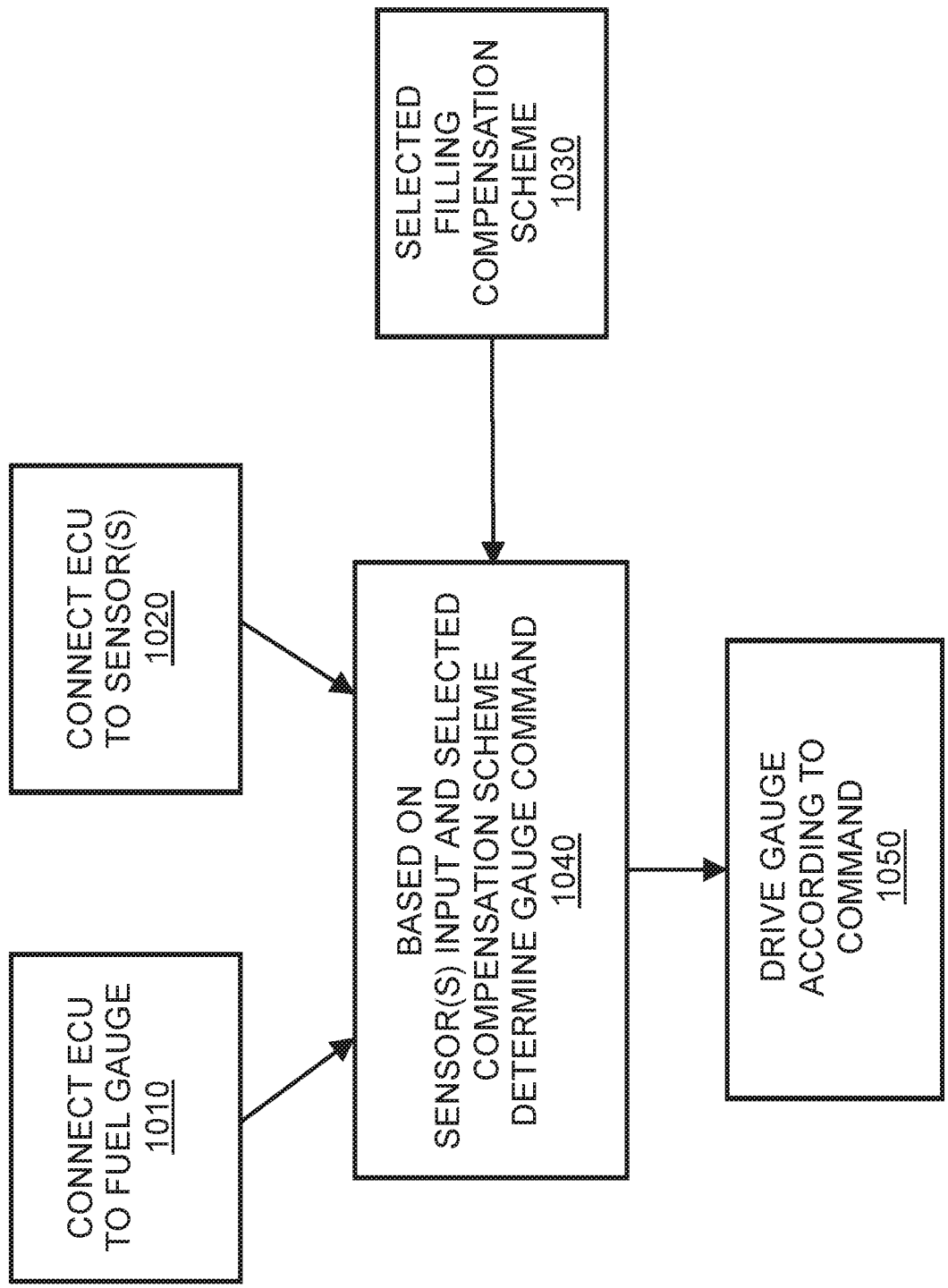
FIG. 10 shows an example of a method for displaying a fuel level using an ECU.

FIG. 10 shows an example of a method for displaying a fuel level using an ECU. The ECU may be connected to a fuel gauge 1010. The ECU may also be connected to one or more sensors 1020. The ECU may be in communication with the fuel gauge and sensors. The ECU may or may not be physically connected to the fuel gauge and/or the sensors. The ECU may be capable of connecting with various types of sensors and/or gauges which may have different configurations. The ECU may be initialized, thereby setting up the ECU with selected sensors and/or gauges. The ECU may be adaptable to work with different types of sensors and gauges. The ECU may be adaptable to operate with different vehicles or vehicle types.

A filling compensation scheme 1030 may have been selected. The filling compensation scheme may have been selected from one or a plurality of filling compensation scheme options. Such options may include none, temperature-based compensation, fuel-based compensation, and/or time-based compensation. Additional options may have been provided. In some instances, only a single option may be selected. Alternatively a plurality of options may have been selected. In some embodiments, the filling compensation may have been selected prior to operation of the vehicle (e.g., key on, turning the key in the ignition). Alternatively, a filling compensation scheme may be selected during or after the operation of a vehicle. A default compensation scheme may be provided.

Based on input from one or more sensor, and/or a selected compensation scheme, a gauge command may be determined 1040. The gauge command may be determined by the ECU. The ECU may receive input from one or more sensor. For example, an ECU may receive information from a pressure sensor, capable of measuring pressure within a fuel tank, a temperature sensor capable of measuring temperature of gaseous fuel within a fuel tank, and/or an ambient temperature sensor, capable of measuring ambient temperature. An ECU may receive information from sensors for a single tank, or from multiple tanks. The ECU may have received an input for a selected filling compensation scheme. The ECU may have received the compensation scheme prior to operation of the vehicle. The ECU may have a selected compensation scheme stored therein. The selected compensation scheme may be stored in a memory of the ECU. The compensation scheme may include one or more algorithm or instructions for providing a gauge command.

The ECU may perform one or more calculation in accordance with the compensation scheme. The calculation may incorporate one or more sensor values. Examples of such calculations and further descriptions of compensation schemes, such as none, temperature-based compensation, fuel-based compensation, and/or time-based compensation, are provided elsewhere herein. The gauge command may be determined based on one or more calculation. For example, a gauge pressure (e.g., Pg) may be calculated. Based on the calculated gauge pressure, one or more gauge command may be provided to the gauge. Examples of gauge commands may include one or more voltage value provided to a gauge, and/or any other signals provided to the gauge.

The gauge may be driven in accordance with the command 1050. The gauge may be driven to display a fuel level. The fuel level may be dependent on a gauge pressure Pg that may be calculated. For example, for a higher Pg value, a higher fuel level may be displayed on a gauge. Driving the gauge may include causing the gauge to display a value, whether it is through a digital or electronically powered display, or a mechanical display with a movable part.

The fuel level may be displayed during operation of a vehicle. For example, a vehicle operator, such as a driver, may power the vehicle on (e.g., by inserting a key into the ignition or any other vehicle powering mechanism known in the art). When the vehicle is on, the gauge may display the fuel level of the vehicle. When the vehicle is powered on, the ECU may determine a gauge command based on sensor input and selected compensations scheme. The ECU may provide a signal to a gauge that may display the fuel level to the vehicle operator. The fuel level may vary during the operation of the vehicle.

In some embodiments, the fuel level is not displayed when the vehicle is not in operation. Alternatively, the fuel level may be displayed when the vehicle is not in operation.

One or more alert may be provided to an operator of the vehicle. The alert may be provided while the vehicle is in operation. In some instances, an alert may be provided even when a vehicle is not in operation. For example, an alert may be provided when the fuel is low. This may be detected when a pressure drops below a threshold value. The ECU may receive the sensor signal for pressure and may or may not compensate based on one or more compensation scheme. The ECU may have a threshold value, and may determine whether the pressure of the fuel has dropped below the threshold.

Another example of an alert may be when a leak is detected. A leak may be detected when the rate of pressure decrease exceeds a leakage threshold. For example, if the pressure drops by more than a certain pressure unit/time unit (e.g., psi/hour), this may indicate a leak and/or an alert may be provided. In some instances, different leakage thresholds may be provided for when a vehicle is in operation (leakage on threshold) and for when a vehicle is not in operation (leakage off threshold). In some instances, during vehicle operation, some pressure decrease may be expected as fuel is consumed. The leakage on threshold may be higher than the leakage off threshold to compensate for the expected pressure drop in fuel when a vehicle is in operation. For example, a leakage on value may be about 1500 psi/hour while a leakage off value may be about 150 psi/hour. Alternatively, the same value may be provided as a leakage threshold, regardless of whether the vehicle is or is not in operation.

An alert may optionally be provided when a threshold number of filling cycles have been completed for the vehicle. The alert may be provided to the operator of the vehicle to get the vehicle serviced. For example, a selected number of filling cycles (filling the vehicle with fuel) may be selected.

In some embodiments, the ECU may determine when one or more filters (e.g., on the vehicle engine, on one or more fuel management components present in the fuel system, etc.) may need to be replaced or serviced. The ECU may notify the vehicle computer, the driver, or other on-board system. For example, the ECU may communicate filter changes to one or more gauges described herein, such as a vehicle dashboard. In another example, the ECU may cause a warning lamp to turn on to indicate that a filter change is needed. In some examples, the ECU may communicate with one or more controls on the vehicle, such as a valve that may allow a flow path with a used filter to be bypassed. The ECU may communicate the need for filter service externally to a filling station, central server, or fleet management software.

Filter monitoring may be accomplished by various means including, but not limited to, providing pressure sensors before and after the filter in a flow path comprising the filter and measuring the difference in pressure, keeping a log of the amount of fuel that has passed through the filter, or by counting the number of fillings. More details on the calculation of the number of fillings are provided elsewhere herein.

During filling, the vehicle may be turned off (e.g., engine off and all auxiliary systems off). When the vehicle is turned off, the ECU may not be powered on. Further, one or more sensors, gauges, controls and/or other ECUs may not be powered on. If the ECU is not powered on and sensor data cannot be directly observed during the fill, it may be necessary for the ECU to compare the state of the system at power on to how it was during the last power off. By comparing the pressure, the temperature, the state of a reed/proximity switch and/or other sensors or indicators, the ECU can determine if the vehicle was filled and by how much. Alternatively, portions or all of the ECU may be powered on during filling. For example, a key position/setting of the vehicle ignition may be provided specifically to allow for ECU to be kept powered on during filling. In some cases, the ECU may remain powered on for a predetermined amount of time (e.g., 20 minutes) after the vehicle is turned off.

Embodiments of the invention may provide an alternate fuel path for lower pressure operation. As described in greater detail through the disclosure, the gaseous fuel containing device may contain fuel stored at a high pressure, and may provide the pressurized fuel to a vehicle engine. As fuel is provided to the engine, fuel in the gaseous fuel containing device is consumed and the fuel pressure drops. In some cases, such as, for example, when the high pressure system gets to about 2× or 3× the minimum operating pressure (wherein the minimum operating pressure may be the pressure required to ensure adequate fuel flow from the gaseous fuel containing device to the engine), starting and/or operating issues may occur. The starting and/or operating issues may be due to designing the fuel path to the engine for high pressure operation. Thus, there is a need to have a separate fuel path for low pressure operation.

The fuel path during low pressure operation may be specifically designed to deliver adequate fuel flow to the engine when the pressure (or amount) of fuel in the gaseous fuel containing device (e.g., tank) decreases to a predetermined value. For example, the low pressure fuel path can be designed for <750 psi operation. The components of the low pressure fuel path may or may not be designed for high pressure operation (e.g., 3600+ psi operation). For example, the low pressure fuel path may be able to withstand high fuel pressure. Alternatively, the low pressure fuel path may not be able to withstand high fuel pressure, and may only be operated when the pressure in the fuel tank (and the remainder of the fuel system) falls below a certain threshold value. In some examples, only a portion of each flow path (e.g., a regulating portion, described next) may be specifically designed for low pressure operation, while the rest of the fuel path may be identical during both low and high pressure operation. In other examples, one or more parallel or switchable flow paths may be provided along the fuel flow path.

In one example, a low pressure fuel path may be provided by placing two regulators, of which one is a high pressure regulator and one is a low pressure regulator, in parallel with each other. The high and low pressure flow paths may be outfitted with electronic solenoid valves and/or pressure sensors before, after, or both before and after each regulator. When the system pressure gets below a certain threshold, the system may route the fuel to the low pressure path. By enabling lower adequate fuel flow to the engine at lower fuel system pressures, vehicle operation before the next refueling may be extended through improved utilization of fuel carried on board the vehicle (i.e., more fuel can be extracted from the tanks since the fuel can continue being extracted down to lower tank pressures). Various combinations or alternative configurations of the above components or of similar components in the art may be used to implement the two paths.

The system may be following instructions provided by the ECU. For example, the ECU may receive temperature, pressure and/or other sensor data and may provide a signal to the one or more solenoid valves to open or close to control (e.g., close or open) appropriate fuel paths.

Further alternative embodiments of the low pressure fuel path may include outfitting the high pressure fuel path (e.g., a first tank outlet, such as a first outlet of a tee connector) with a valve or other flow control component that automatically closes below a predetermined inlet pressure. The low pressure fuel path (e.g., a second tank outlet, such as a second outlet of a tee connector) may be outfitted with a valve (e.g., reverse acting valve) or flow control component of opposite functionality, i.e., that automatically opens below a predetermined inlet pressure. In this configuration, the alternate fuel paths may or may not be controlled by the ECU.

In some embodiments, one or more fuel tanks or gaseous fuel containing devices may be provided on the vehicle. When more than one tank is provided, one or more of the tanks may be controlled by the ECU to enable staged fuel delivery of the fuel stored in the tanks. For example, the ECU may control one or more electronic solenoid valves. The ECU may receive data from one or more pressure/temperature sensors. These solenoid valves and pressure/temperature sensors may be provided, for example, on a neck of each tank, on one tank (e.g., on the body, or on the neck), on a combination of tanks (e.g., on two of a plurality of tanks, on all tanks, etc.), or elsewhere in the system. For example, with solenoid valves and pressure/temperature sensors on the neck of each tank, the ECU may close some tanks off and keep others open during operation. Tanks may be actively opened, actively closed, kept open or kept closed by the ECU. In some cases, one or more solenoid valves may be provided separately from one or more pressure/temperature sensors on each tank. Some tanks may have either solenoid valve(s), or pressure/temperature sensor(s). In some cases, a majority of tanks may have pressure/temperature sensor(s), while only some tanks may have solenoid valve(s). Alternatively, solenoid valve(s) may be provided on all tanks, but only a subset of the valve(s) may be controlled by the ECU for staged fuel delivery. Each tank may have one or more of a solenoid valve, a pressure sensor or a temperature sensor.

In some embodiments of a multiple tank system, the tanks may be used one tank at a time. For example, one tank may be used only for starting or cranking, and the rest of the tanks may be used for driving operation. In this configuration, one tank or a subset of tanks may be maintained at high pressure, which may prevent the previously described issues with low pressure starting. Alternatively, fuel may be consumed from one tank or a subset of tanks at a time. The ECU enables switching between tanks at any time during operation. Similarly, the ECU, if utilized during filling, may also enable controlled filling of the tanks. For example, tanks may not need to be accessed one at a time, but a unified fuel inlet controlled by the ECU may be used to fill all tanks. In some cases, tanks may be filled or drained according to a predefined schedule or settings. The predefined schedule or settings may be set by the user, automatically controlled by the ECU, or a combination thereof.

By utilizing the tanks in a staged configuration, it is possible to save time and energy refueling if the tanks are not completely drained. For example, if there is a five tank system, the tanks were being consumed sequentially and only two of the five tanks have been drained, then the station will only need to fill two tanks up to full pressure.

The ECU may further control high and low pressure fuel paths provided on one or more of a plurality of tanks during staged fuel delivery. For example, high and low pressure fuel paths may be provided on each tank. Alternatively, for example when some tanks are used only for high pressure operation during starting and some tanks are used only for variable pressure operation during driving, the starting tanks may only be provided with a high pressure path, while the driving tanks may be provided with the high pressure and low pressure paths. Each tank may have one or more of a solenoid valve, a pressure sensor or a temperature sensor. Alternatively, the tanks may share one or more sensors and/or solenoid valves. The sensors, solenoid valves and/or other tank components may be individually controlled by the ECU. Alternatively, the ECU may simultaneously control groups of sensors, solenoid valves and/or other tank components on multiple tanks.

In some embodiments, one or more kill caps may be provided. If one or more specified operational condition is detected, a starter interrupt circuit may prevent a vehicle from being started. For example, during a filling procedure while a fuel dispenser is connected to a vehicle receptacle (e.g., fluidically connected to a vehicle tank), the starter interrupt logic may cause the one or more kill caps to kill a connection, preventing the starting the vehicle. The kill caps may be switches that may kill the connection. For example, if a driver of the vehicle were to forget to disconnect the dispenser and drive the vehicle, an explosion may occur. However, with the kill caps safety mechanism, the driver can not start the engine while the fuel dispenser is connected to the vehicle (e.g., like pressing the clutch pedal to start a standard transmission vehicle). The starter interrupt may be controlled without the use of relays, which can create voltage spikes in the electrical system. In some embodiments, a plurality of kill switches may be provided. For example three or more kill switches may be provided. The kill switches may be provided at different points or locations of the vehicle. One kill switch may be provided to check a dust cap on a vehicle receptacle. Another kill switch may be provided at the vehicle receptacle. Another kill switch may be provided for a fill panel door. Additional or alternative configurations of kill switches are possible, for example, as provided in U.S. Provisional Patent Application Ser. No. 61/612,902 ("IGNITION DISCONNECT"), filed Mar. 19, 2012, which is incorporated herein by reference in its entirety.

In some embodiments, the ECU may monitor the life of one or more gaseous fuel containing devices (fuel tanks) on a vehicle. The ECU may be able to determine when a fuel tank (gaseous fuel containing device) will need to be replaced or serviced. The ECU may notify a vehicle computer, driver (e.g., via a gauge, dashboard, or warning lamp) or other on board system or entity described herein. The ECU may communicate the need for tank service externally to a filling station, a central server, fleet management software, or other external entity described herein.

In some cases, the life of the tank and/or the amount of time between tank inspections may be a fixed number of years. This may not take into account the amount of stress and/or the type of stress that the tank has been subjected to over its lifetime. The determination of tank life may be improved by utilizing one or more sensors on the tank, including, but not limited to, pressure, temperature, strain, acceleration, proximity, reed switch and/or light sensors. The sensors may be in communication with the ECU and may transmit data to the ECU. The data from the sensors may be logged with a time stamp. Using the time stamped sensor data, the amount of stress each tank has been under may be determined using various models. The stress calculation may be executed on board (e.g., by the ECU), on a central server or other remote information system or device (e.g., by sending the collected data by any of the communication means described herein), or a combination thereof. Using the amount of stress that the tank has been exposed to over its lifetime may provide a more accurate measure for determining when the next service should be and/or the overall lifespan of each tank in the system.

The sensor data, the calculated stress, the determination of the tank life and/or other associated data may be transmitted to a filling station in order to prevent filling of a tank that may not be in a condition to be filled. For ea example, the data may be communicated to the filling station in order to prevent the filling of an uninspected tank (e.g., a tank for which damage or stress was detected, and which may need to be inspected and/or replaced before being fit for service). The data may be communicated, for example, from the ECU or from the remote information system or device on which the stress and/or tank life calculation was executed.

Embodiments of the invention may include electronic witness systems. The ECU may observe the current state of the fuel and/or vehicle system, for example via one or more sensors, and may communicate the system status to the driver, the vehicle, fleet software, a filling station, or any other on board or external entity described herein. The status of the system may include, for example, preventative maintenance information, real-time electronic witness data, or other system data. The electronic witness data may include, but is not limited to, tank or body cover damage detection, temperature and pressure data, data from strain gauges and data from a G-ball or other acceleration sensor.

In some cases, the ECU may be able to detect if damage was done to a tank or body cover from a very thin conductive inlay into the body cover panels. If the circuit of the conductive inlay is broken, the ECU may communicate to the vehicle, the driver, fleet software, a filling station, or any other on board or external entity described herein that damage has been done to a body cover. Communication of the electronic witness data may ensure timely inspection of the damage. The electronic witness systems may be provided on one or more tanks, on one or more tank covers, or elsewhere within the vehicle. Examples of electronic witness systems utilized for gaseous fuel containing devices are provided in U.S. Provisional Patent Application Ser. No. 61/613,933 ("SMART COVERS"), filed Mar. 21, 2012, which is incorporated herein by reference in its entirety. The electronic witness functionality may not be limited to the vehicle fuel system. For example, the electronic witness functionality may be applied on an engine cylinder, on the vehicle chassis, or in other locations on the vehicle.

The electronic witness functionality may include communication of the ECU with strain gauges or other sensors on critical components that can determine damage or stress on the critical components. The ECU may use pressure and temperature data to determine if there was a fire or an accident. In the case of a fire or an accident, the ECU may notify one or more entities described in more detail elsewhere herein that a tank service or an inspection is needed. The ECU may communicate with a G-ball or other acceleration sensor that can determine if an accident has occurred. In response, the ECU may adjust vehicle operation by, for example, turning off electronic solenoids at tanks to prevent fuel loss. In another example, the ECU may notify a station, a driver or any other entity described herein that an inspection is necessary before the next refueling. The ECU may activate an alarm (e.g., an alarm on a gauge or a dashboard, a warning lamp) when triggered one or more electronic witness systems. Alternatively, or additionally, the ECU may notify a fleet service provider or fleet manager during minor (non-critical) events.

The electronic witness functionality may interact with one or more functionality in accordance with the present disclosure. For example, an electronic witness system on a fuel tank or body cover may communicate with the ECU that damage has occurred, The ECU may then communicate with, for example, an ignition disconnect or kill switch system to switch off ignition. In some cases, as described in greater detail with reference to FIG. 11, the electronic witness system may communicate directly with the ignition disconnect system or with any other entity in communication with the ECU or otherwise provided on the vehicle.

Figure 11:
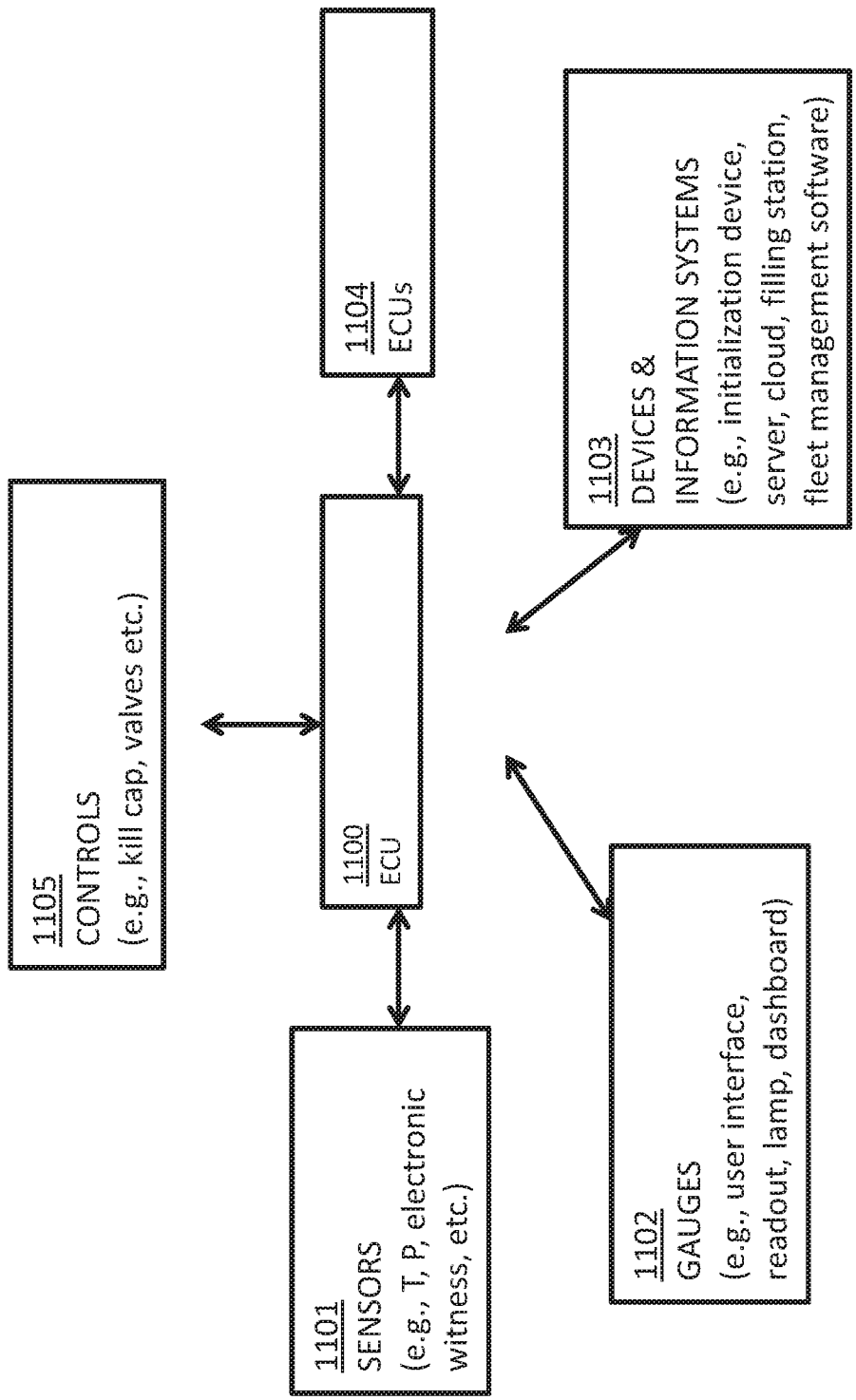
FIG. 11 shows examples of entities in communication with an ECU.

FIG. 11 shows examples of entities with which an ECU 1100 may communicate. Such entities include one or more sensors 1101 (e.g., temperature sensors, pressure sensors, electronic witness sensors or any other sensors described herein), one or more gauges 1102 (e.g., readouts, including mechanical needle readouts, user interfaces, indicator lamp, vehicle dashboard or any other gauges or indicators described herein), one or more controls 1105 (e.g., kill switches or kill caps, valves, tanks or tank components, tank or body covers or components thereof, or any other controls described herein), one or more ECUs 1104 (e.g., ECU associated with a kill cap or a body tank/body cover, ECU associated with engine manifold, or any other ECUs described herein), and/or one or more devices or information systems hosted on devices 1103 (e.g., initialization device, server, cloud, filling station, fleet management software, or any other device or information system hosted on a device described herein). The entities with which the ECU interacts may interact with each other. In some examples, one or more of the entities may interact with the ECU by proxy (e.g., via another entity). Further, one or more entities such as an electronic witness may function both as a sensor and as a control. For example, in some cases, an electronic witness component may communicate data or information to the ECU. In other cases, or additionally, the ECU may provide instructions or send data to the electronic witness component (e.g., the ECU may trigger an electronic witness circuit in response to an event elsewhere in the system that was communicated to the ECU). Further variations include functionality of a control system as a gauge, and so on. One or more entities may be located on board the vehicle (e.g., gauges, sensors, controls, other ECUs).

One or more entities may be located externally to the vehicle (e.g., gauges, devices). For example, a filling station is external to the vehicle and may be in communication with the vehicle's ECU. In some examples, sensors or controls may also be located externally to the vehicle, such as, for example, an external sensor in communication (e.g., wirelessly) with the ECU during filling, or an external control (e.g., fuel pump) in communication with the ECU during filling, etc. Thus, the entities in FIG. 11 may communicate with the ECU, with each other, interchangeable and/or by proxy. The entities in FIG. 11 may be located on the vehicle or externally to the vehicle.

Any of the entities in communication with the ECU may utilize any communication types and interfaces, connection types and interfaces, set-up interfaces, initialization interfaces, user interfaces, and associated methods described in detail elsewhere herein. Thus, for example, a communication interface for an initialization device may be utilized for providing a communication interface for another ECU, a communication type used for communicating with an initialization device may be utilized to communicate with a filling station, and so on.

The ECU may communicate with other devices, sensors, gauges, ECUs, and the vehicle (including components/ systems and controls on board the vehicle). The ECU may communicate to other electronic devices and sensors both on the vehicle and to external servers, devices, filling/fueling stations and/or other entities using one or more communication protocols and via one or more type of connection. For example, the ECU may communicate using either passive or active RFID, Wi-Fi, Blue Tooth, or other wireless communication methods, or over a direct wire connection such as, for example, USB, Ethernet, Firewire, serial, or single wire, etc. The ECU may send and receive data to and from the ECU using the CAN protocol or other vehicle communication protocol, or to external computers, servers, or devices using a number of communication protocols including, for example, TCP/IP, serial, USB, or other communication method. The ECU may also receive inputs from the vehicle, such as, for example, speed, distance traveled, amount of time injector was open, fuel consumption, etc. The ECU may communicate data or signals to fueling station, the vehicle dashboard or other devices or information systems hosted on devices. In some embodiments, the ECU may be able to communicate or partially communicate while the vehicle is turned off (e.g., filling). Power to the ECU during such operation may be supplied, for example, from one or more auxiliary power sources on board the vehicle (e.g., a battery) or one or more power sources external to the vehicle in electronic communication with the ECU and/or the vehicle via a wired or wireless power connection.

The ECU may log all data from all systems on board the vehicle. The ECU may communicate with all systems on board the vehicle. The ECU may communicate with systems external to the vehicle. Examples of data transmitted may include the vehicle identification number (VIN), license plate, vehicle model, tank configuration, number of tanks, fleet vehicle number, system serial number, system status, number of fill cycles, filter service and tank service data, sensor data, temperature data, or any other data that has been collected or observed. Diagnostics may be communicated to and from the ECU (e.g., via the CAN protocol) and integrated into the vehicle's error codes. These error codes may be transmitted to external electronics, fleet software, servers, the driver, etc.

Vehicle data collected in other systems (e.g., other ECUs or controls), such as, for example, speed or distance traveled, may be sent to the ECU and used in calculations along with data the ECU collects via its sensors or other communication channels. These calculations may include, but are not limited to, average fuel consumption per mile, instantaneous fuel consumption, total range left before the next refueling, etc.

The transmitted data may be uploaded to fleet tracking software for easy integration into vehicle maintenance tracking, fuel consumption tracking, vehicle fuel efficiency tracking in miles per gallon Diesel equivalent (MPGDe), vehicle efficiency tracking in cost per mile ($/mile), and/or other parameters. Service data (e.g., filter changes, tank life data, damage detected by electronic witness systems) may be sent to a central server where replacement parts can be purchased and service or warranty requests can be sent. The warranty and/or service requests may be sent along with data that has been logged while the problem was occurring, thus enabling fast diagnosis. In some examples, autonomous diagnosis may be enabled.

In some embodiments, the ECU may enable data logging and acquisition. The ECU may collect data from various sensors and store the data with a timestamp of when the data was collected. The data may be processed on board (e.g., by the ECU), on a central server in communication with the ECU after it has been transmitted via methods discussed earlier, or a combination thereof. The data may be stored in memory and/or transmitted in either a compressed or raw data form. The data may take the form of aggregate data to minimize memory storage size. The data may be raw data from all sensors. The data may be able to be streamed in real time and observed on either a display inside the vehicle, on a computer or display directly connected to the ECU, on a computer or display in remote communication with the ECU or via any other communication/connection method described herein.

One or more characteristics, components, features, and/or steps known in the art may be incorporated and/or used. See, e.g., U.S. Pat. Nos. 5,379,637 and 6,957,171, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for determining an amount of fuel in a gaseous fuel containing device, the method comprising:
    initializing an electronic control unit to operate with a sensor configured to monitor a condition of the gaseous fuel containing device and/or a fuel gauge;
    placing the electronic control unit in communication with the sensor and the fuel gauge;

receiving, at the electronic control unit, an input for a selected compensation scheme chosen from a plurality of compensation schemes;

receiving, at the electronic control unit, a first signal from the sensor;

calculating the amount of fuel in the gaseous fuel containing device based on the input, the first signal, and/or stored data, the amount being calculated with reference to the selected compensation scheme corresponding to the input; and causing the fuel gauge to display the amount of fuel in the gaseous fuel containing device.

2. The method of claim 1, further comprising measuring a pressure within the gaseous fuel containing device using the sensor.

3. The method of claim 1, further comprising measuring a temperature of the fuel in the gaseous fuel containing device using the sensor.

4. The method of claim 1, further comprising measuring an ambient temperature using the sensor.

5. The method of claim 1, wherein receiving, at the electronic control unit, the input for the selected compensation scheme occurs prior to operation of a vehicle.

6. The method of claim 1, wherein each of the plurality of compensation schemes comprises an instruction for providing a gauge command.

7. The method of claim 1, wherein calculating the amount of fuel in the gaseous fuel containing device comprises accounting for non-linearity of gas compressibility.

8. The method of claim 1, wherein calculating the amount of fuel in the gaseous fuel containing device comprises performing one or more algorithm.

9. The method of claim 1, further comprising displaying the amount of fuel in the gaseous fuel containing device in volume measurements.

10. The method of claim 1, further comprising displaying the amount of fuel in the gaseous fuel containing device in percentages and/or fractions.

11. The method of claim 1, further comprising calibrating a look up table comprising at least one gauge command.

12. The method of claim 1, further comprising programming the electronic control unit to operate with another sensor and/or another fuel gauge.

13. The method of claim 1, wherein initializing the electronic control unit comprises setting up the fuel gauge.

14. The method of claim 1, wherein initializing the electronic control unit comprises performing diagnostics.

15. The method of claim 1, further comprising monitoring a filter change.

16. A method for determining an amount of fuel in a gaseous fuel containing device, the method comprising:
configuring an electronic control unit to:
communicate with a sensor, the sensor configured to monitor a condition of the gaseous fuel containing device and a fuel gauge;
receive an input for a selected compensation scheme chosen from a plurality of compensation schemes;
receive a first signal from the sensor;
calculate the amount of fuel in the gaseous fuel containing device based on the input, the first signal, and/or stored data, the amount being calculated with reference to the selected compensation scheme corresponding to the input; and
cause the fuel gauge to display the amount of fuel in the gaseous fuel containing device.

17. The method of claim 16, further comprising initializing the electronic control unit to operate with the sensor and/or the fuel gauge.

* * * * *

UNITED STATES PATENT AND TRADEMARK OFFICE
CERTIFICATE OF CORRECTION

PATENT NO. : 10,865,732 B2  
APPLICATION NO. : 16/247148  
DATED : December 15, 2020  
INVENTOR(S) : Todd F. Sloan Page 1 of 1

It is certified that error appears in the above-identified patent and that said Letters Patent is hereby corrected as shown below:

On page 3, in Column 2, item (56), Other Publications, Line 5, delete "Accesed" and insert --Accessed--.

In Column 10, Line 44, delete "Amtel" and insert --Atmel--.

In Column 23, Line 35, delete "For ea" and insert --For--.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*